US012812682B2

(12) United States Patent
Kim et al.

(10) Patent No.: US 12,812,682 B2
(45) Date of Patent: Nov. 24, 2026

(54) PREAMBLE DURATION COORDINATION FOR MULTI-ACCESS POINT TRANSMISSION

(71) Applicant: Ofinno, LLC, Reston, VA (US)

(72) Inventors: Jeongki Kim, Fairfax, VA (US); Leonardo Alisasis Lanante, Reston, VA (US); Esmael Hejazi Dinan, McLean, VA (US); Serhat Erkucuk, Reston, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/434,066

(22) Filed: Dec. 29, 2025

(65) Prior Publication Data

US 2026/0136393 A1 May 14, 2026

Related U.S. Application Data

(63) Continuation of application No. PCT/US2024/048821, filed on Sep. 27, 2024.

(Continued)

(51) Int. Cl.
*H04W 74/0816* (2024.01)
*H04W 16/28* (2009.01)

(52) U.S. Cl.
CPC ....... *H04W 74/0816* (2013.01); *H04W 16/28* (2013.01)

(58) Field of Classification Search
CPC ......... H04W 74/0808; H04W 74/0816; H04W 74/0825; H04W 16/28
See application file for complete search history.

(56) References Cited

U.S. PATENT DOCUMENTS

| | | | | |
|---|---|---|---|---|
| 9,912,513 | B2 | 3/2018 | Kwon | |
| 11,510,157 | B1 * | 11/2022 | Hathi | H04W 52/367 |

(Continued)

FOREIGN PATENT DOCUMENTS

| | | | |
|---|---|---|---|
| KR | 20150134140 | A | 12/2015 |
| WO | 2025058470 | A1 | 3/2025 |

OTHER PUBLICATIONS

IEEE 802.11-23/1620r0; Sep. 2023; Reverse TXOP sharing in UHR; Date: Sep. 13, 2023; Sindhu Verma et al.

(Continued)

*Primary Examiner* — Liton Miah
(74) *Attorney, Agent, or Firm* — Yasser Mourtada; Kavon Nasabzadeh; James Bender

(57) ABSTRACT

In an aspect, a first access point (AP) receives from a second AP a first frame indicating a number of stations (STAs), associated with the second AP, for a downlink (DL) transmission from the second AP. The AP transmits to the second AP, a second frame indicating an allocated time, of a transmission opportunity (TXOP) obtained by the first AP, for the DL transmission, an identifier of the second AP, and a time period for a preamble of a downlink (DL) physical layer protocol data unit (PPDU) for the DL transmission, the time period based on the number of STAs. In another aspect a first AP transmits to a second AP a frame indicating a number of STAs associated with the first AP for a DL transmission. The first AP receives a frame indicating a time period for a part of a DL PPDU, based on the number of STAs.

20 Claims, 21 Drawing Sheets

Related U.S. Application Data

(60) Provisional application No. 63/541,319, filed on Sep. 29, 2023.

(56) References Cited

U.S. PATENT DOCUMENTS

| | | | | |
|---|---|---|---|---|
| 11,683,774 | B2 | 6/2023 | Oteri et al. | |
| 12,095,527 | B2 | 9/2024 | Chitrakar et al. | |
| 12,563,506 | B2 * | 2/2026 | Tong | H04W 52/367 |
| 2011/0032907 | A1 | 2/2011 | Sahara | |
| 2013/0215867 | A1 | 8/2013 | Gomez Coloma et al. | |
| 2015/0024802 | A1 | 1/2015 | Callard et al. | |
| 2015/0341847 | A1 | 11/2015 | Kang et al. | |
| 2016/0174166 | A1 | 6/2016 | Someya et al. | |
| 2020/0076552 | A1 * | 3/2020 | Cherian | H04L 5/0035 |
| 2020/0107318 | A1 | 4/2020 | Chu et al. | |
| 2022/0377679 | A1 | 11/2022 | Hathi et al. | |
| 2023/0096535 | A1 * | 3/2023 | El Ferkouss | H04W 72/27 370/350 |
| 2024/0422746 | A1 | 12/2024 | Park et al. | |
| 2025/0212279 | A1 | 6/2025 | Li et al. | |
| 2025/0330916 | A1 * | 10/2025 | Chun | H04W 52/24 |

OTHER PUBLICATIONS

IEEE 802.11-23/0249r1; 01/10/202; Extended TXOP Sharing; Date: Jan. 10, 2023; Liwen Chu et al.

IEEE 802.11-23/581r0; Apr. 2023; Non-AP initiated TXOP sharing; Date: Apr. 14, 2023; Shawn (Sanghyun) Kim et al.

IEEE 802.11-23/1327r0; Aug. 2023; Considerations on Return TXOP between multiple APs; Date: Aug. 7, 2023; Si-Chan Noh et al.

IEEE 802.11-23/1387r1; Aug. 2023; TXOP optimizations to support XR use-cases; Date: Sep. 13, 2023; Dibakar Das et al.

IEEE 802.11-19/1788r1; Nov. 2019; Coordinated OFDMA Operation; Date: Jan. 14, 2020; Yongho Seok et al.

International Search Report and Written Opinion of the International Searching Authority mailed Dec. 17, 2024, in International Application No. PCT/US2024/048821.

* cited by examiner

300

500

PREAMBLE DURATION COORDINATION FOR MULTI-ACCESS POINT TRANSMISSION

CROSS-REFERENCE TO RELATED APPLICATIONS

This application is a continuation of International Application No. PCT/US 2024/048821, filed Sep. 27, 2024, which claims the benefit of U.S. Provisional Application No. 63/541,319, filed Sep. 29, 2023, all of which are hereby incorporated by reference in their entireties.

BRIEF DESCRIPTION OF THE DRAWINGS

Examples of several of the various embodiments of the present disclosure are described herein with reference to the drawings.

DETAILED DESCRIPTION

Figure 1:
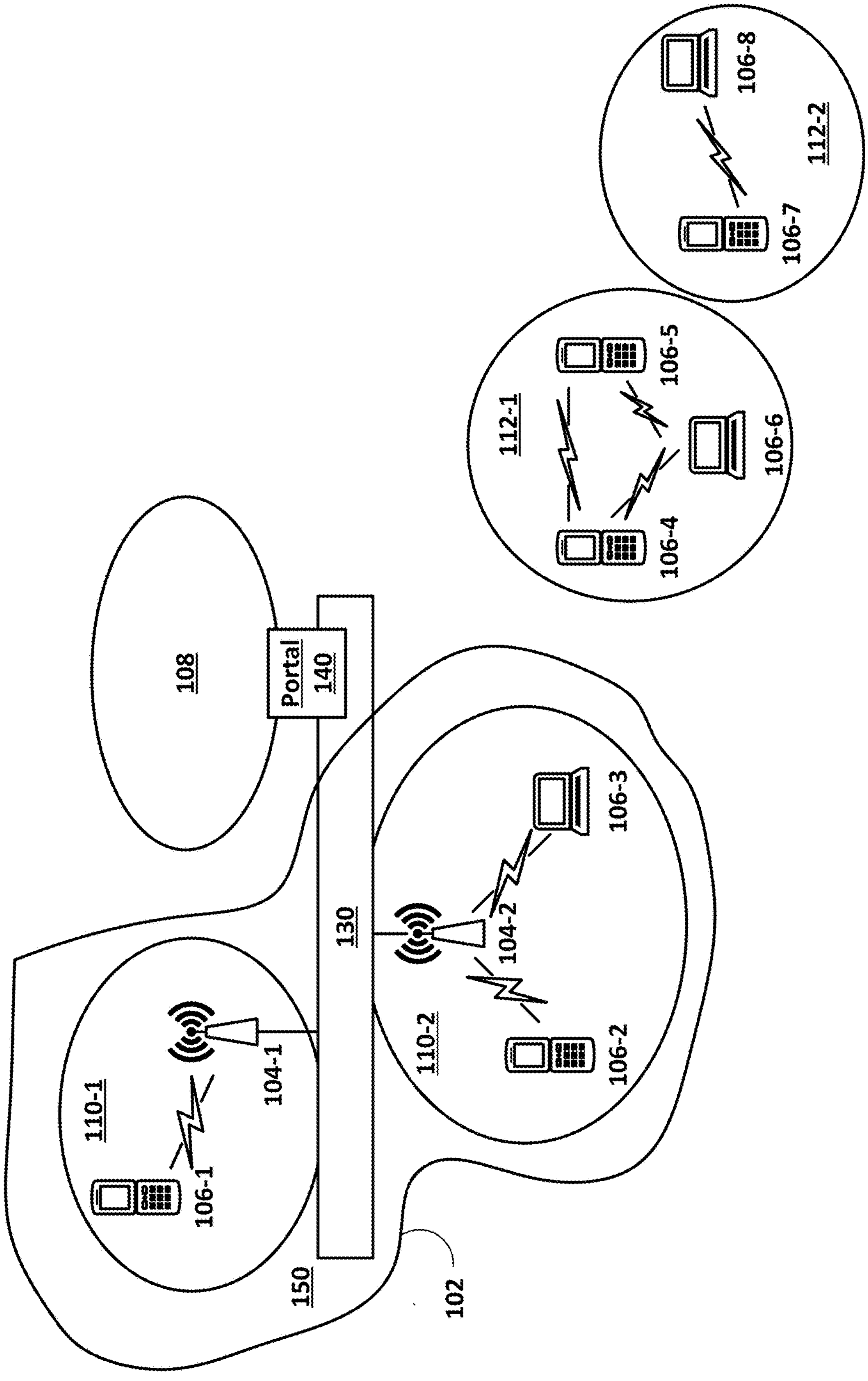
FIG. 1 illustrates example wireless communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. After reading the description, it will be apparent to one skilled in the relevant art how to implement alternative embodiments. The present embodiments may not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages are presented for example purposes only. The disclosed architecture is sufficiently flexible and configurable, such that it may be utilized in ways other than those shown. For example, the actions listed in any flowchart may be re-ordered or only optionally used in some embodiments.

Embodiments may be configured to operate as needed. The disclosed mechanism may be performed when certain criteria are met, for example, in a station, an access point, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, may be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={STA1, STA2} are: {STA1}, {STA2}, and {STA1, STA2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages/frames comprise a plurality of parameters, it implies that a parameter in the plurality of parameters is in at least one of the one or more messages/frames but does not have to be in each of the one or more messages/frames.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g., hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers, and microprocessors are programmed using languages such as assembly, C, C++, or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1 illustrates example wireless communication networks in which embodiments of the present disclosure may be implemented.

As shown in FIG. 1, the example wireless communication networks may include an Institute of Electrical and Electronic Engineers (IEEE) 802.11 (WLAN) infra-structure network 102. WLAN infra-structure network 102 may include one or more basic service sets (BSSs) 110 and 120 and a distribution system (DS) 130.

BSS 110-1 and 110-2 each includes a set of an access point (AP or AP STA) and at least one station (STA or non-AP STA). For example, BSS 110-1 includes an AP 104-1 and a STA 106-1, and BSS 110-2 includes an AP 104-2 and STAs 106-2 and 106-3. The AP and the at least one STA in a BSS perform an association procedure to communicate with each other.

DS 130 may be configured to connect BSS 110-1 and BSS 110-2. As such, DS 130 may enable an extended service set (ESS) 150. Within ESS 150, APs 104-1 and 104-2 are connected via DS 130 and may have the same service set identification (SSID).

WLAN infra-structure network 102 may be coupled to one or more external networks. For example, as shown in FIG. 1, WLAN infra-structure network 102 may be connected to another network 108 (e.g., 802.X) via a portal 140. Portal 140 may function as a bridge connecting DS 130 of WLAN infra-structure network 102 with the other network 108.

The example wireless communication networks illustrated in FIG. 1 may further include one or more ad-hoc networks or independent BSSs (IBSSs). An ad-hoc network or IBSS is a network that includes a plurality of STAs that are within communication range of each other. The plurality of STAs are configured so that they may communicate with each other using direct peer-to-peer communication (i.e., not via an AP).

For example, in FIG. 1, STAs 106-4, 106-5, and 106-6 may be configured to form a first IBSS 112-1. Similarly, STAs 106-7 and 106-8 may be configured to form a second IBSS 112-2. Since an IBSS does not include an AP, it does not include a centralized management entity. Rather, STAs within an IBSS are managed in a distributed manner. STAs forming an IBSS may be fixed or mobile.

A STA as a predetermined functional medium may include a medium access control (MAC) layer that complies with an IEEE 802.11 standard. A physical layer interface for a radio medium may be used among the APs and the non-AP stations (STAs). The STA may also be referred to using various other terms, including mobile terminal, wireless device, wireless transmit/receive unit (WTRU), user equipment (UE), mobile station (MS), mobile subscriber unit, or user. For example, the term "user" may be used to denote a STA participating in uplink Multi-user Multiple Input, Multiple Output (MU MIMO) and/or uplink Orthogonal Frequency Division Multiple Access (OFDMA) transmission.

A physical layer (PHY) protocol data unit (PPDU) may be a composite structure that includes a PHY preamble and a payload in the form of a PHY service data unit (PSDU). For example, the PSDU may include a PHY preamble and header and/or one or more MAC protocol data units (MPDUs). The information provided in the PHY preamble may be used by a receiving device to decode the subsequent data in the PSDU. In instances in which PPDUs are transmitted over a bonded channel (channel formed through channel bonding), the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

A frequency band may include one or more sub-bands or frequency channels. For example, PPDUs conforming to the IEEE 802.11n, 802.11ac, 802.11ax and/or 802.11be standard amendments may be transmitted over the 2.4 GHz, 5 GHz, and/or 6 GHz bands, each of which may be divided into multiple 20 MHz channels. The PPDUs may be transmitted over a physical channel having a minimum bandwidth of 20 MHz. Larger channels may be formed through channel bonding. For example, PPDUs may be transmitted over physical channels having bandwidths of 40 MHz, 80 MHz, 160 MHz, or 320 MHz by bonding together multiple 20 MHz channels.

Figure 2:
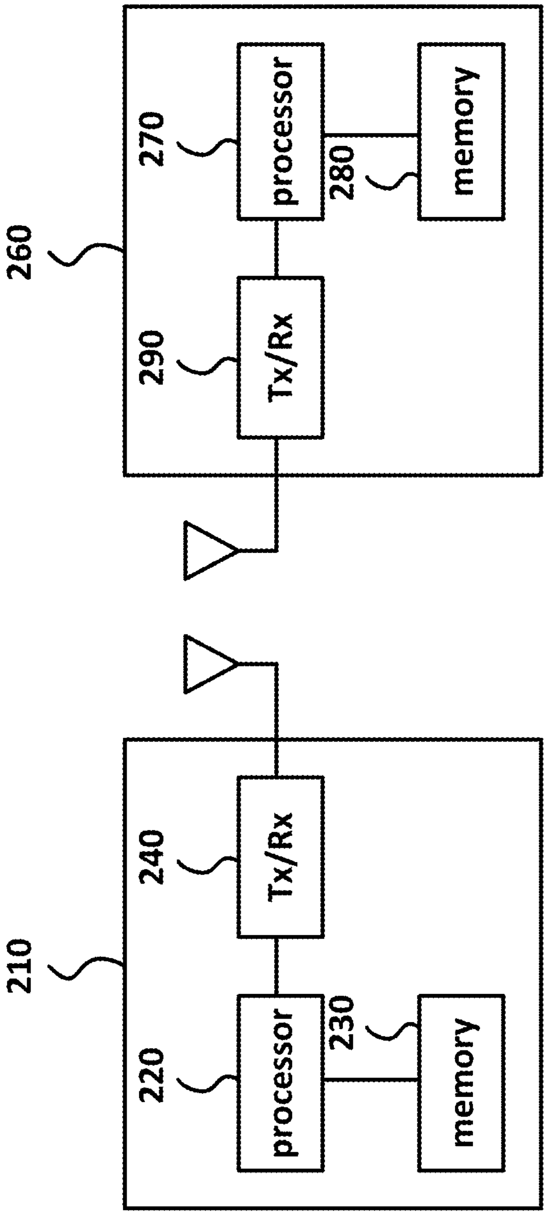
FIG. 2 is a block diagram illustrating example implementations of a station (STA) and an access point (AP).

FIG. 2 is a block diagram illustrating example implementations of a STA 210 and an AP 260. As shown in FIG. 2, STA 210 may include at least one processor 220, a memory 230, and at least one transceiver 240. AP 260 may include at least one processor 270, a memory 280, and at least one transceiver 290. Processor 220/270 may be operatively connected to memory 230/280 and/or to transceiver 240/290.

Processor 220/270 may implement functions of the PHY layer, the MAC layer, and/or the logical link control (LLC) layer of the corresponding device (STA 210 or AP 260). Processor 220/270 may include one or more processors and/or one or more controllers. The one or more processors and/or one or more controllers may comprise, for example, a general-purpose processor, a digital signal processor (DSP), a microcontroller, an application specific integrated circuit (ASIC), a field programmable gate array (FPGA), a logic circuit, or a chipset, for example.

Memory 230/280 may include a read-only memory (ROM), a random-access memory (RAM), a flash memory, a memory card, a storage medium, and/or other storage unit. Memory 230/280 may comprise one or more non-transitory computer readable mediums. Memory 230/280 may store computer program instructions or code that may be executed by processor 220/270 to carry out one or more of the operations/embodiments discussed in the present application. Memory 230/280 may be implemented (or positioned) within processor 220/270 or external to processor 220/270. Memory 230/280 may be operatively connected to processor 220/270 via various means known in the art.

Transceiver 240/290 may be configured to transmit/receive radio signals. In an embodiment, transceiver 240/290 may implement a PHY layer of the corresponding device (STA 210 or AP 260). In an embodiment, STA 210 and/or AP 260 may be a multi-link device (MLD), that is a device capable of operating over multiple links as defined by the IEEE 802.11 standard. As such, STA 210 and/or AP 260 may each implement multiple PHY layers. The multiple PHY layers may be implemented using one or more of transceivers 240/290.

Target wake time (TWT), a feature introduced in the IEEE 802.11ah standard, allows STAs to manage activity in the BSS by scheduling STAs to operate at different times to reduce contention. TWTs may allow STAs to reduce the required amount of time that a STA utilizing a power management mode may be awake. TWTs may be individual TWTs or broadcast TWTs. Individual TWTs follow a negotiated TWT agreement between STAs. Broadcast TWTs are based on a schedule set and provided to STAs by an AP.

In an individual TWT, a STA that requests a TWT agreement is called a TWT requesting STA. The TWT requesting STA may be a non-AP STA for example. The STA that responds to the request is called a TWT responding STA. The TWT responding STA may be an AP for example. The TWT requesting STA is assigned specific times to wake up and exchange frames with the TWT responding STA. The TWT requesting STA may communicate wake scheduling information to the TWT responding STA. The TWT responding STA may transmit TWT values to the TWT requesting STA when a TWT agreement is established between them.

When explicit TWT is employed, the TWT requesting STA may wake up and perform a frame exchange. The TWT requesting STA may receive a next TWT information in a response from the TWT responding STA. When implicit TWT is used, the TWT requesting STA may calculate a next TWT by adding a fixed value to the current TWT value.

The TWT values for implicit TWT may be periodic. The TWT requesting STA operating with an implicit TWT agreement may determine a next TWT service period (TWT SP) start time by adding a value of a TWT wake interval associated with the TWT agreement to the value of the start time of the current TWT SP. The TWT responding STA may include the start time for a series of TWT SPs corresponding to a single TWT flow identifier of an implicit TWT agreement in a target wake time field of a TWT element. The TWT element may contain a value of 'accept TWT' in a TWT setup command field. The start time of the TWT SP series may indicate the start time of a first TWT SP in the series. Start times of subsequent TWT SPs may be determined by adding the value of the TWT wake interval to the start time of the current TWT SP. In an example, the TWT requesting STA, awake for an implicit TWT SP, may enter a doze state after the TWT SP has elapsed or after receiving an end of service period (EOSP) field equal to 1 from the TWT responding STA, whichever occurs first.

A TWT session may be negotiated between an AP and a STA. The TWT session may configure a TWT SP of DL and UL traffic between the AP and the STA. Expected traffic may be limited within the negotiated SP. The TWT SP may start at a specific time. The TWT SP may run for an SP duration. The TWT SP may repeat every SP interval.

Figure 3:
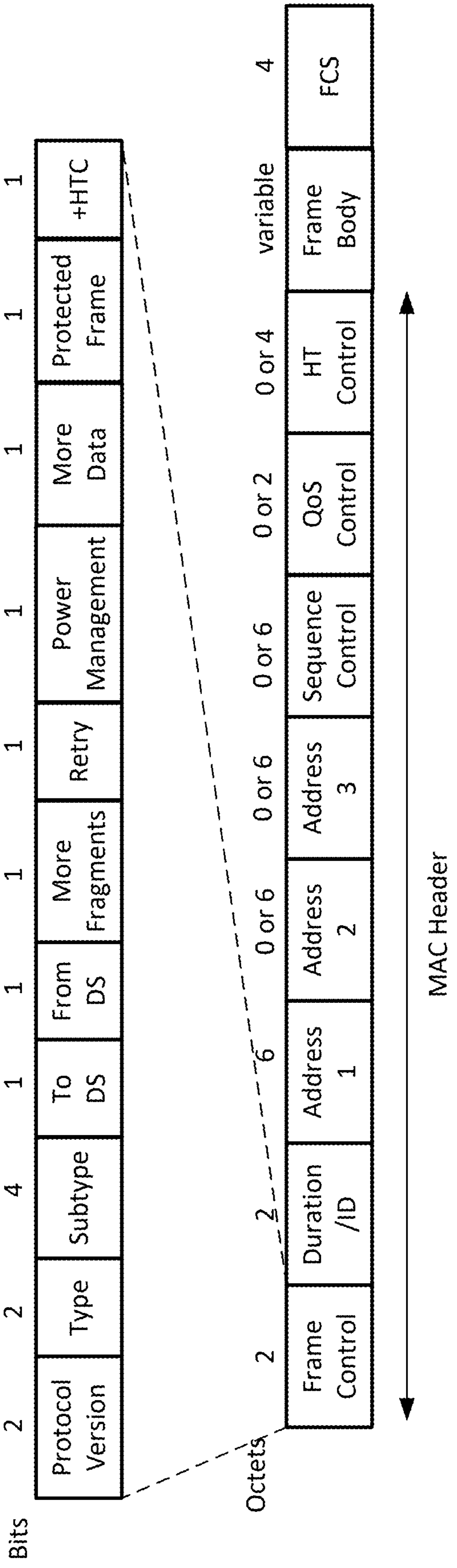
FIG. 3 illustrates an example of a Medium Access Control (MAC) frame format.

FIG. 3 illustrates an example 300 of a MAC frame format. In operation, a STA may construct a subset of MAC frames for transmission and may decode a subset of received MAC frames upon validation. The particular subsets of frames that a STA may construct and/or decode may be determined by the functions supported by the STA. A STA may validate a received MAC frame using the frame check sequence (FCS) contained in the frame and may interpret certain fields from the MAC headers of all frames.

As shown in FIG. 3, a MAC frame includes a MAC header, a variable length frame body, and a frame check sequence (FCS).

The MAC header includes a frame control field, an optional duration/ID field, address fields, an optional sequence control field, an optional QoS control field, and an optional HT control field.

The frame control fields include the following subfields: protocol version, type, subtype, To DS, From DS, more fragments, retry, power management, more data, protected frame, and +HTC.

The protocol version subfield is invariant in size and placement across all revisions of the IEEE 802.11 standard. The value of the protocol version subfield is 0 for MAC frames.

The type and subtype subfields together identify the function of the MAC frame. There are three frame types: control, data, and management. Each of the frame types has several defined subtypes. Bits within the subtype subfield are used to indicate a specific modification of the basic data frame (subtype 0). For example, in data frames, the most significant bit (MSB) of the subtype subfield, bit 7 (B7) of the frame control field, is defined as the QoS subfield. When the QoS subfield is set to 1, it indicates a QoS subtype data frame, which is a data frame that contains a QoS control field in its MAC header. The second MSB of the subtype field, bit 6 (B6) of the frame control field, when set to 1 in data subtypes, indicates a data frame that contain no frame body field.

The To DS subfield indicates whether a data frame is destined to the distribution system (DS). The From DS subfield indicates whether a data frame originates from the DS.

The more fragments subfield is set to 1 in all data or management frames that have another fragment to follow of the MAC service data unit (MSDU) or MAC management protocol data unit (MMPDU) carried by the MAC frame. It is set to 0 in all other frames in which the more fragments subfield is present.

The retry subfield is set to 1 in any data or management frame that is a retransmission of an earlier frame. It is set to 0 in all other frames in which the retry subfield is present. A receiving STA uses this indication to aid it in the process of eliminating duplicate frames. These rules do not apply for frames sent by a STA under a block agreement.

The power management subfield is used to indicate the power management mode of a STA.

The More Data subfield indicates to a STA in power save (PS) mode that bufferable units (BUs) are buffered for that STA at the AP. The more data subfield is valid in individually addressed data or management frames transmitted by an AP to a STA in PS mode. The more data subfield is set to 1 to indicate that at least one additional buffered BU is present for the STA.

The protected frame subfield is set to 1 if the frame body field contains information that has been processed by a cryptographic encapsulation algorithm.

The +HTC subfield indicates that the MAC frame contains an HT control field.

The duration/ID field of the MAC header indicates various contents depending on frame type and subtype and the QoS capabilities of the sending STA. For example, in control frames of the power save poll (PS-Poll) subtype, the duration/ID field carries an association identifier (AID) of the STA that transmitted the frame in the 14 least significant bits (LSB), and the 2 most significant bits (MSB) are both set to 1. In other frames sent by STAs, the duration/ID field contains a duration value (in microseconds) which is used by a recipient to update a network allocation vector (NAV). The NAV is a counter that it indicates to a STA an amount of time during which it must defer from accessing the shared medium.

There can be up to four address fields in the MAC frame format. These fields are used to indicate the basic service set identifier (BSSID), source address (SA), destination address (DA), transmitting address (TA), and receiving address (RA). Certain frames might not contain some of the address fields. Certain address field usage may be specified by the relative position of the address field (1-4) within the MAC header, independent of the type of address present in that field. Specifically, the address 1 field always identifies the intended receiver(s) of the frame, and the address 2 field, where present, always identifies the transmitter of the frame.

The sequence control field includes two subfields, a sequence number subfield, and a fragment number subfield. The sequence number subfield in data frames indicates the sequence number of the MSDU (if not in an Aggregated MSDU (A-MSDU)) or A-MSDU. The sequence number subfield in management frames indicates the sequence number of the frame. The fragment number subfield indicates the number of each fragment of an MSDU or MMPDU. The fragment number is set to 0 in the first or only fragment of an MSDU or MMPDU and is incremented by one for each successive fragment of that MSDU or MMPDU. The fragment number is set to 0 in a MAC protocol data unit (MPDU) containing an A-MSDU, or in an MPDU containing an MSDU or MMPDU that is not fragmented. The fragment number remains constant in all retransmissions of the fragment.

The QoS control field identifies the traffic category (TC) or traffic stream (TS) to which the MAC frame belongs. The QoS control field may also indicate various other QoS related, A-MSDU related, and mesh-related information about the frame. This information can vary by frame type, frame subtype, and type of transmitting STA. The QoS control field is present in all data frames in which the QoS subfield of the subtype subfield is equal to 1.

The HT control field is present in QoS data, QoS null, and management frames as determined by the +HTC subfield of the frame control field.

The frame body field is a variable length field that contains information specific to individual frame types and subtypes. It may include one or more MSDUs or MMPDUs. The minimum length of the frame body is 0 octets.

The FCS field contains a 32-bit Cyclic Redundancy Check (CRC) code. The FCS field value is calculated over all of the fields of the MAC header and the frame body field.

Figure 4:
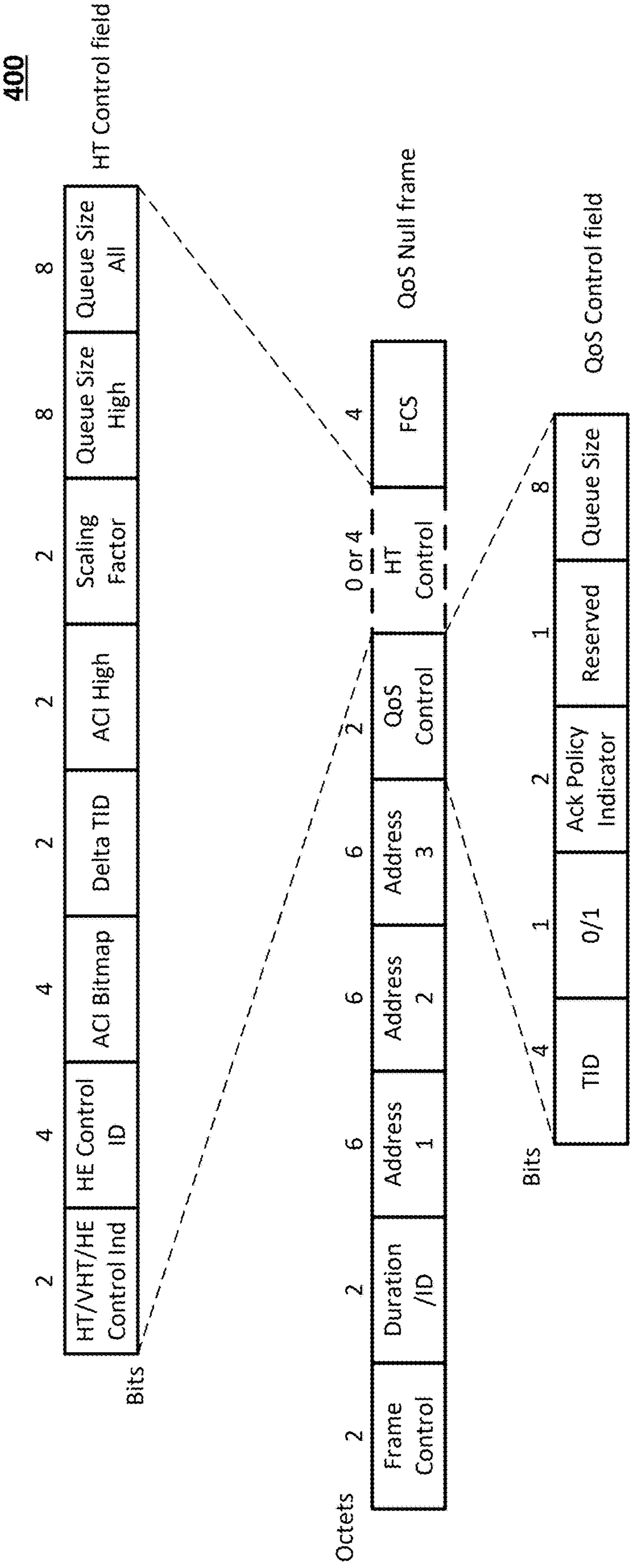
FIG. 4 illustrates an example of a Quality of Service (QoS) null frame indicating buffer status information.

FIG. 4 illustrates an example 400 of a Quality of Service (QoS) null frame indicating buffer status information. A QoS null frame refers to a QoS data frame with an empty frame body. A QoS null frame includes a QoS control field and an optional HT control field which may contain a buffer status report (BSR) control subfield. A QoS null frame indicating buffer status information may be transmitted by a STA to an AP.

The QoS control field may include a traffic identifier (TID) subfield, an ack policy indicator subfield, and a queue size subfield (or a transmission opportunity (TXOP) duration requested subfield).

The TID subfield identifies the TC or TS of traffic for which a TXOP is being requested, through the setting of the TXOP duration requested or queue size subfield. The encoding of the TID subfield depends on the access policy (e.g., Allowed value 0 to 7 for enhanced distributed channel access (EDCA) access policy to identify user priority for either TC or TS).

The ack policy indicator subfield, together with other information, identifies the acknowledgment policy followed upon delivery of the MPDU (e.g., normal ack, implicit block ack request, no ack, block ack, etc.)

The queue size subfield is an 8-bit field that indicates the amount of buffered traffic for a given TC or TS at the STA for transmission to the AP identified by the receiver address of the frame containing the subfield. The queue size subfield is present in QoS null frames sent by a STA when bit 4 of the QoS control field is set to 1. The AP may use information contained in the queue size subfield to determine t TXOP duration assigned to the STA or to determine the uplink (UL) resources assigned to the STA.

In a frame sent by or to a non-High Efficiency (non-HE) STA, the following rules may apply to the queue size value:

- The queue size value is the approximate total size, rounded up to the nearest multiple of 256 octets and expressed in units of 256 octets, of all MSDUs and A-MSDUs buffered at the STA (excluding the MSDU or A-MSDU contained in the present QoS Data frame) in the delivery queue used for MSDUs and A-MSDUs with TID values equal to the value indicated in the TID subfield of the QoS Control field.
- A queue size value of 0 is used solely to indicate the absence of any buffered traffic in the queue used for the specified TID.
- A queue size value of 254 is used for all sizes greater than 64 768 octets.
- A queue size value of 255 is used to indicate an unspecified or unknown size.

In a frame sent by an HE STA to an HE AP, the following rules may apply to the queue size value.

The queue size value, QS, is the approximate total size in octets, of all MSDUs and A-MSDUs buffered at the STA (including the MSDUs or A-MSDUs contained in the same PSDU as the frame containing the queue size subfield) in the delivery queue used for MSDUs and A-MSDUs with TID values equal to the value indicated in the TID subfield of the QoS control field.

The queue size subfield includes a scaling factor subfield in bits B14-B15 of the QoS control field and an unscaled value, UV, in bits B8-B13 of the QoS control field. The scaling factor subfield provides the scaling factor, on.

A STA obtains the queue size, QS, from a received QoS control field, which contains a scaling factor, SF, and an unscaled value, UV, as follows:

QS=

16×UV, if SF is equal to 0;

1024+256×UV, if SF is equal to 1;

17 408+2048×UV, if SF is equal to 2;

148 480+32 768×UV, if SF is equal to 3 and UV is less than 62;

>2 147 328, if SF equal to is 3 and UV is equal to 62;

Unspecified or Unknown, if SF is equal to 3 and UV is equal to 63.

The TXOP duration requested subfield, which may be included instead of the queue size subfield, indicates the duration, in units of 32 microseconds (us), that the sending STA determines it needs for its next TXOP for the specified TID. The TXOP duration requested subfield is set to 0 to indicate that no TXOP is requested for the specified TID in the current service period (SP). The TXOP duration requested subfield is set to a nonzero value to indicate a requested TXOP duration in the range of 32 us to 8160 us in increments of 32 us.

The HT control field may include a BSR control subfield which may contain buffer status information used for UL MU operation. The BSR control subfield may be formed from an access category index (ACI) bitmap subfield, a delta TID subfield, an ACI high subfield, a scaling factor subfield, a queue size high subfield, and a queue size all subfield of the HT control field.

The ACI bitmap subfield indicates the access categories for which buffer status is reported (e.g., B0: best effort (AC_BE), B1: background (AC_BK), B2: video (AC_VI), B3: voice (AC_VO), etc.). Each bit of the ACI bitmap subfield is set to 1 to indicate that the buffer status of the corresponding AC is included in the queue size all subfield, and set to 0 otherwise, except that if the ACI bitmap subfield is 0 and the delta TID subfield is 3, then the buffer status of all 8 TIDs is included.

The delta TID subfield, together with the values of the ACI bitmap subfield, indicate the number of TIDs for which the STA is reporting the buffer status.

The ACI high subfield indicates the ACI of the AC for which the BSR is indicated in the queue size high subfield. The ACI to AC mapping is defined as ACI value 0 mapping to AC_BE, ACI value 1 mapping to AC_BK, ACI value 2 mapping to AC_VI, and ACI value 3 mapping to AC_VO.

The scaling factor subfield indicates the unit SF, in octets, of the queue size high and queue size all subfields.

The queue size high subfield indicates the amount of buffered traffic, in units of SF octets, for the AC identified by the ACI high subfield, that is intended for the STA identified by the receiver address of the frame containing the BSR control subfield.

The queue size all subfield indicates the amount of buffered traffic, in units of SF octets, for all Acs identified by the ACI Bitmap subfield, that is intended for the STA identified by the receiver address of the frame containing the BSR control subfield.

The queue size values in the queue size high and queue size all subfields are the total sizes, rounded up to the nearest multiple of SF octets, of all MSDUs and A-MSDUs buffered at the STA (including the MSDUs or A-MSDUs contained in the same PSDU as the frame containing the BSR control subfield) in delivery queues used for MSDUs and A-MSDUs associated with AC(s) that are specified in the ACI high and ACI bitmap subfields, respectively.

A queue size value of 254 in the queue size high and queue size all subfields indicates that the amount of buffered traffic is greater than 254×SF octets. A queue size value of 255 in the queue size high and queue size all subfields indicates that the amount of buffered traffic is an unspecified or unknown size. The queue size value of QoS data frames containing fragments may remain constant even if the amount of queued traffic changes as successive fragments are transmitted.

MAC service provides peer entities with the ability to exchange MSDUs. To support this service, a local MAC uses the underlying PHY-level service to transport the MSDUs to a peer MAC entity. Such asynchronous MSDU transport is performed on a connectionless basis.

Figure 5:
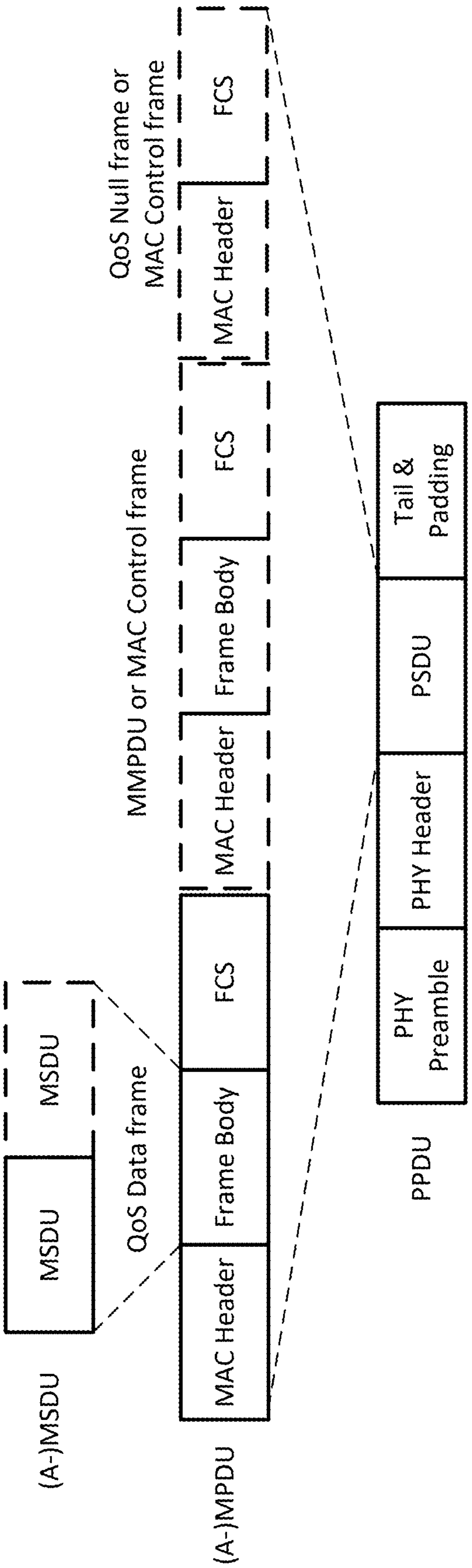
FIG. 5 illustrates an example format of a physical layer (PHY) protocol data unit (PPDU).

FIG. 5 illustrates an example format of a PPDU. As shown, the PPDU may include a PHY preamble, a PHY header, a PSDU, and tail and padding bits.

The PSDU may include one or more MPDUs, such as a QoS data frame, an MMPDU, a MAC control frame, or a QoS null frame. In the case of an MPDU carrying a QoS data frame, the frame body of the MPDU may include a MSDU or an A-MSDU.

By default, MSDU transport is on a best-effort basis. That is, there is no guarantee that a transmitted MSDU will be delivered successfully. However, the QoS facility uses a traffic identifier (TID) to specify differentiated services on a per-MSDU basis.

A STA may differentiate MSDU delivery according to designated traffic category (TC) or traffic stream (TS) of individual MSDUs. The MAC sublayer entities determine a user priority (UP) for an MSDU based on a TID value provided with the MSDU. The QoS facility supports eight UP values. The UP values range from 0 to 7 and form an ordered sequence of priorities, with 1 being the lowest value, 7 the highest value, and 0 falling between 2 and 3.

An MSDU with a particular UP is said to belong to a traffic category with that UP. The UP may be provided with each MSDU at the medium access control service access point (MAC SAP) directly in an UP parameter. An aggregate MPDU (A-MPDU) may include MPDUs with different TID values.

A STA may deliver buffer status reports (BSRs) to assist an AP in allocating UL MU resources. The STA may either implicitly deliver BSRs in the QoS control field or BSR control subfield of any frame transmitted to the AP (unsolicited BSR) or explicitly deliver BSRs in a frame sent to the AP in response to a BSRP Trigger frame (solicited BSR).

The buffer status reported in the QoS control field includes a queue size value for a given TID. The buffer status reported in the BSR control field includes an ACI bitmap, delta TID, a high priority AC, and two queue sizes.

A STA may report buffer status to the AP, in the QoS control field, of transmitted QoS null frames and QoS data frames and, in the BSR control subfield (if present), of transmitted QoS null frames, QoS data frames, and management frames as defined below.

The STA may report the queue size for a given TID in the queue size subfield of the QoS control field of transmitted QoS data frames or QoS null frames; the STA may set the queue size subfield to 255 to indicate an unknown/unspecified queue size for that TID. The STA may aggregate multiple QoS data frames or QoS null frames in an A-MPDU to report the queue size for different TIDs.

The STA may report buffer status in the BSR control subfield of transmitted frames if the AP has indicated its support for receiving the BSR control subfield.

A High-Efficiency (HE) STA may report the queue size for a preferred AC, indicated by the ACI high subfield, in the queue size high subfield of the BSR control subfield. The STA may set the queue size high subfield to 255 to indicate an unknown/unspecified queue size for that AC.

A HE STA may report the queue size for ACs indicated by the ACI bitmap subfield in the queue size all subfield of the BSR control subfield. The STA may set the queue size all subfield to 255 to indicate an unknown/unspecified BSR for those ACs.

Triggered TXOP sharing (TXS) is a technique introduced in the IEEE 802.11be standard amendment. TXS allows an AP to allocate a time duration within an obtained TXOP to a STA for transmitting one or more non-trigger-based (non-TB) PPDUs. For the TXS procedure, the AP may transmit a multi-user request-to-send (MU-RTS) trigger frame with a triggered TXOP sharing mode subfield set to a non-zero value. The MU-RTS trigger frame is a trigger frame for triggering CTS frame(s) from multiple users. An MU-RTS trigger frame with the triggered TXOP sharing mode subfield set to a non-zero value is called an MU-RTS TXS trigger (MRTT) frame.

In an example, when the triggered TXOP sharing mode subfield is set to 1, the STA may transmit the one or more non-TB PPDUs to the AP during the allocated time duration. In an example, when the triggered TXOP sharing mode subfield is set to 2, the STA may transmit the one or more non-TB PPDUs to the AP or a peer STA during the allocated time duration. The peer STA may be a STA with a connection for peer-to-peer (P2P) communication or direct communication with the STA. In an example, the direct wireless link is established according to the tunneled direct link setup (TDLS) protocol.

Figure 6:
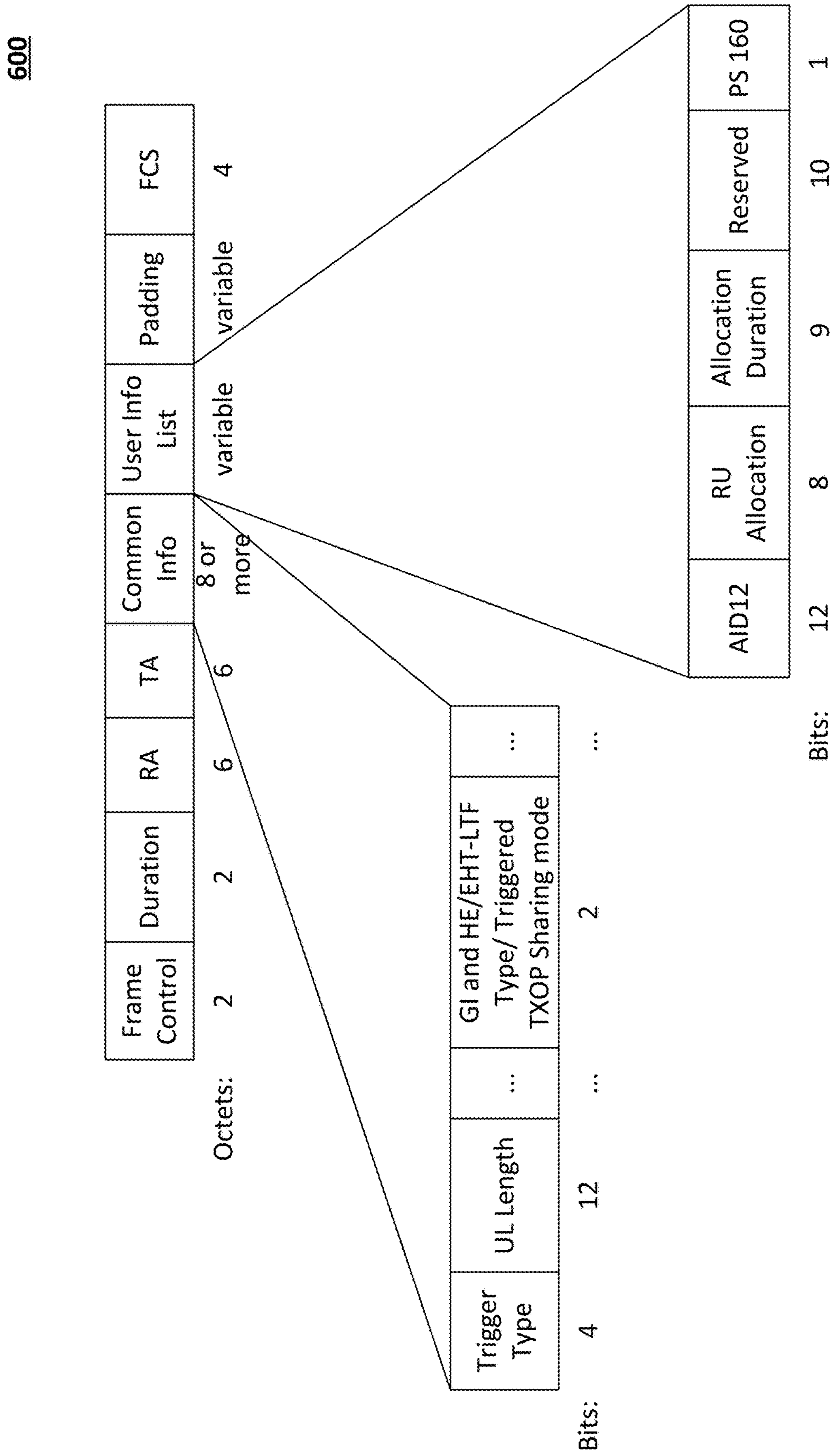
FIG. 6 illustrates an example Multi-User Request-to-Send (MU-RTS) trigger frame which may be used in a triggered Transmit Opportunity (TXOP) sharing (TXS) procedure.

FIG. 6 illustrates an example MRTT frame 600 which may be used in a TXS procedure. As shown in FIG. 6, example MRTT frame 600 may comprise a frame control field, a duration field, a receiver address (RA) field, a transmitter address (TA) field, a common info field, a user info list field, a padding field, and/or frame check sequence (FCS) field.

In an example, the common info field may be a high-efficiency (HE) variant common info field or an extremely high throughput (EHT) variant common info field. An EHT variant common info field may comprise, as shown in FIG. 6, one or more of the following subfields: trigger type, UL length, more TF, CS required, UL BW, GI and HE/EHT-LTF Type/Triggered TXOP sharing mode, number of HE/EHT-LTF symbols, LDPC extra symbol segment, AP Tx Power, Pre-FEC padding factor, PE disambiguity, UL spatial reuse, HE/EHT P160, special user info field flag, EHT reserved, reserved, or trigger dependent common info.

The trigger type subfield indicates that frame 600 is an MRTT frame.

The GI and HE/EHT-LTF Type/Triggered TXOP sharing mode subfield may include a triggered TXOP sharing mode subfield. In an example, the triggered TXOP sharing mode subfield may be set to a non-zero value (e.g., 1 or 2). In an example, the triggered TXOP sharing mode subfield may be set to 1. As such, the triggered TXOP sharing mode subfield may indicate that a STA indicated by an AID12 subfield of a user info field (of the user info list field) may transmit one or more non-TB PPDUs to the AP during a time indicated in the allocation duration subfield of the user info field. In another example, the triggered TXOP sharing mode subfield may be set to 2. As such, the triggered TXOP sharing mode subfield may indicate that a STA indicated by an AID12 subfield of a user info field (of the user info list field) may transmit one or more non-TB PPDUs to the AP or to a peer STA during the time indicated by the allocation duration subfield of the user info field. In an example, the peer STA may be a STA with a connection for P2P communication or direct communication with the STA.

The user info list field may include one or more user info fields. In an example, an EHT variant user info field may comprise, as shown in FIG. 6, one or more of the following subfields: AID12, RU allocation, allocation duration, reserved, or PS160.

The AID12 subfield may indicate an association identifier (AID) of a STA that may use a time indicated by the allocation duration subfield.

The RU allocation subfield may indicate the location and size of the RU allocated for a STA indicated by the AID12 subfield.

The allocation duration subfield may indicate a time allocated by an AP transmitting MRTT frame 600. The allocated time may be a portion a TXOP obtained by the AP.

In an example embodiment, the allocation duration subfield may indicate a first time period.

Figure 7:
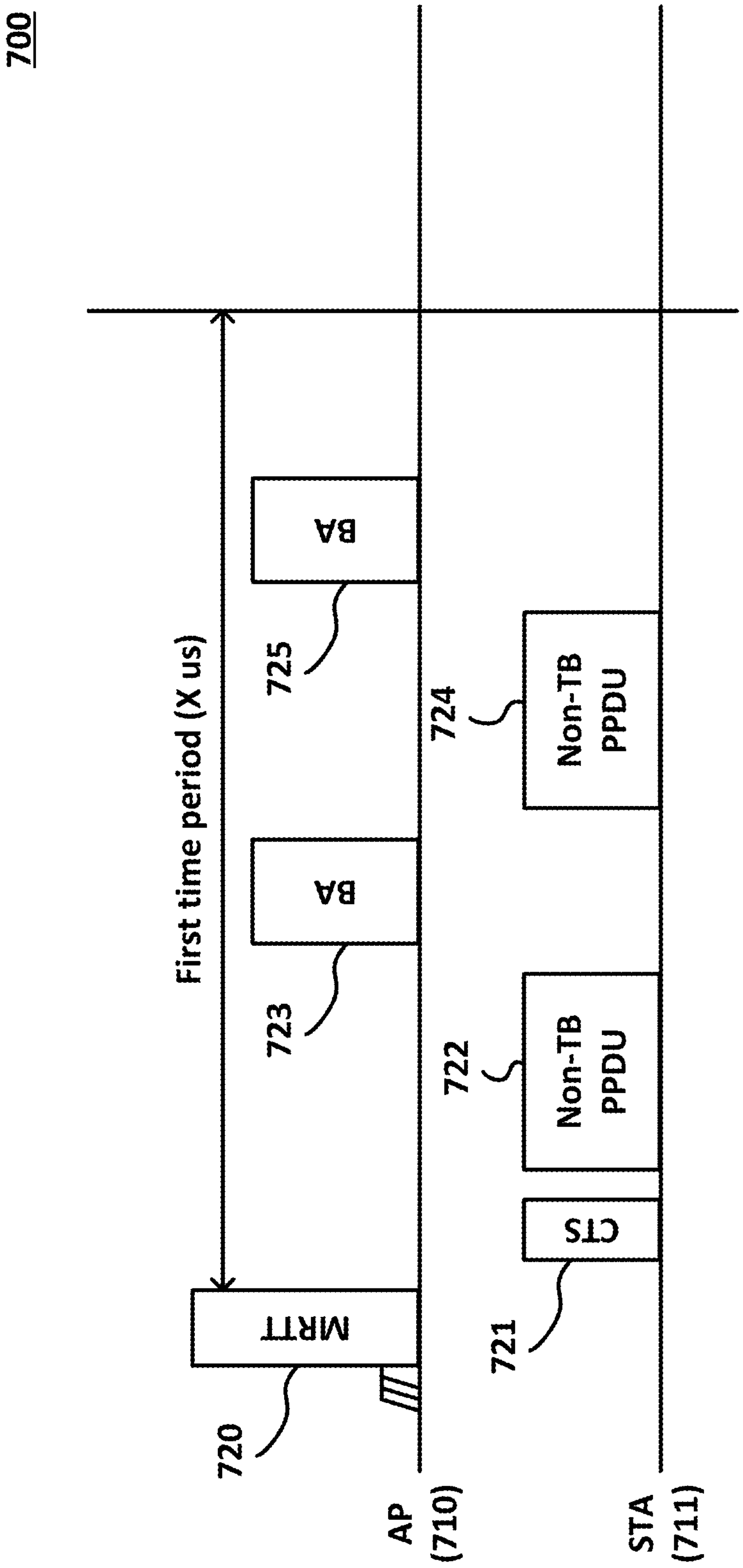
FIG. 7 illustrates an example of a TXS procedure (Mode=1).

FIG. 7 illustrates an example 700 of a TXS procedure (Mode=1). As shown in FIG. 7, the TXS procedure may begin by an AP 710 transmitting an MRTT frame 720 to a STA 711. MRTT frame 720 may allocate a portion of a TXOP obtained by AP 710 to STA 711 and may indicate a TXS mode equal to 1. STA 711 receiving MRTT frame 720 may use the allocated time to transmit one or more non-TB PPDUs to AP 710. The one or more non-TB PPDUs may comprise a data frame, a control frame, a management frame, or an action frame.

In an example, MRTT frame 720 may comprise a triggered TXOP sharing mode subfield that indicates the TXS mode and/or subfield that indicates a first time period corresponding to the allocated time. In an example, the first time period may be set to a value of X microseconds (us).

STA 711 may respond to MRTT frame 720 by transmitting a CTS frame 721 to AP 710. Subsequently, STA 711 may transmit non-TB PPDUs 722, 724 comprising one or more data frame to AP 710 during the first time period indicated in MRTT frame 720. In an example, AP 710 may transmit one or more Block Ack (BA) frames 723, 725 in response to the one or more data frames contained in non-TB PPDUs 722, 724 received from STA 711.

Figure 8:
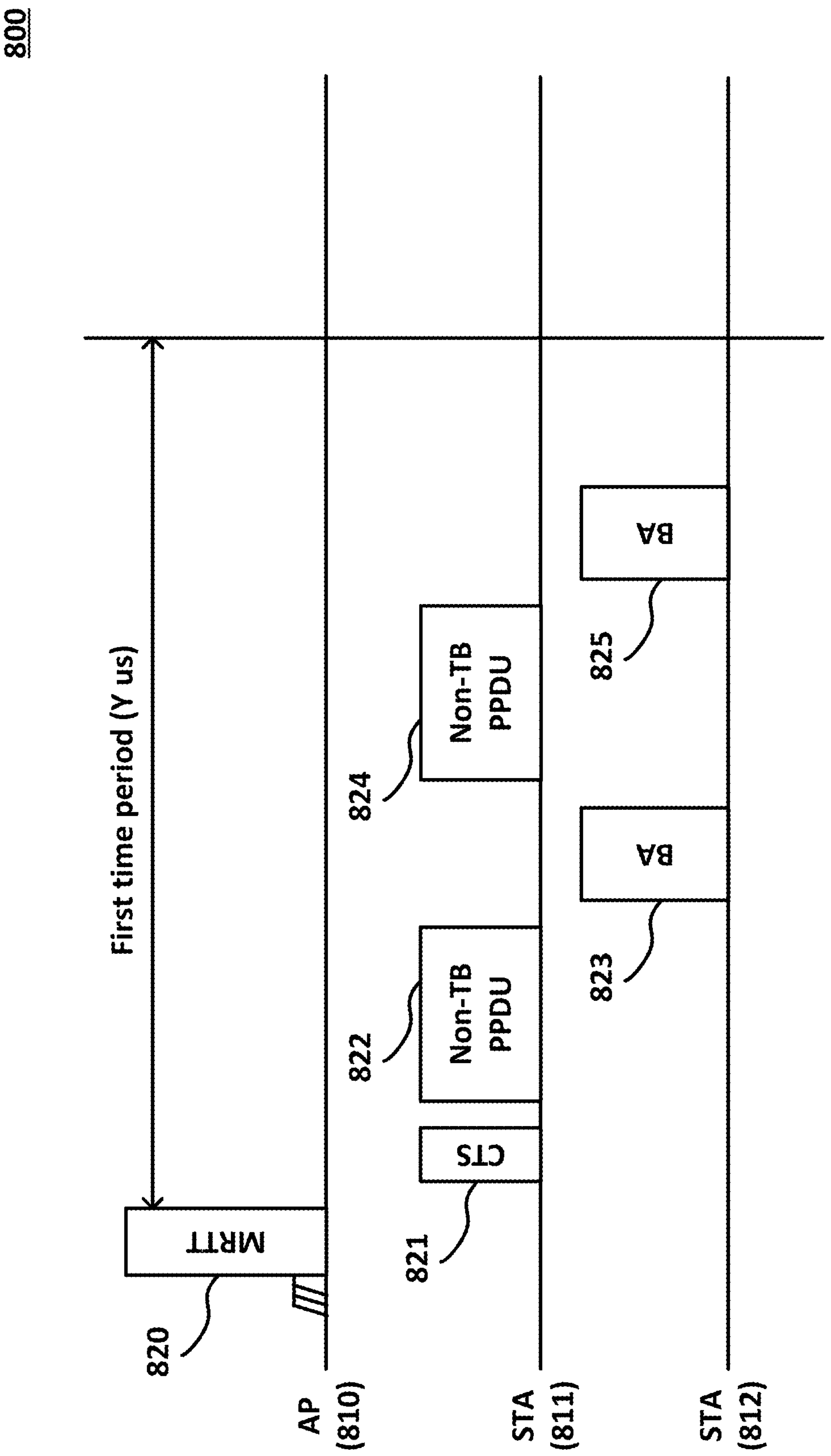
FIG. 8 illustrates an example of a TXS procedure (Mode=2).

FIG. 8 illustrates an example 800 of a TXS procedure (Mode=2). As shown in FIG. 8, the TXS procedure may begin by an AP 810 transmitting an MRTT frame 820 to a STA 811. MRTT frame 820 may allocate a portion of a TXOP obtained by AP 810 to STA 811 and may indicate a TXS mode equal to 2. STA 811 receiving MRTT frame 820 may use the allocated time to transmit one or more non-TB PPDUs to STA 812. The one or more non-TB PPDUs may comprise a data frame, a control frame, a management frame, or an action frame.

In an example, MRTT frame 820 may comprise a triggered TXOP sharing mode subfield that indicates the TXS mode and/or subfield that indicates a first time period corresponding to the allocated time. In an example, the first time period may be set to a value of X microseconds (us).

STA 811 may respond to MRTT frame 820 by transmitting a CTS frame 821 to AP 810. Subsequently, STA 811 may transmit non-TB PPDUs 822, 824 comprising one or more data frame to STA 818 during the first time period indicated in MRTT frame 720. In an example, STA 812 may transmit one or more BA frames 823, 825 in response to the one or more data frames contained in non-TB PPDUs 822, 824 received from STA 811.

Figure 9:
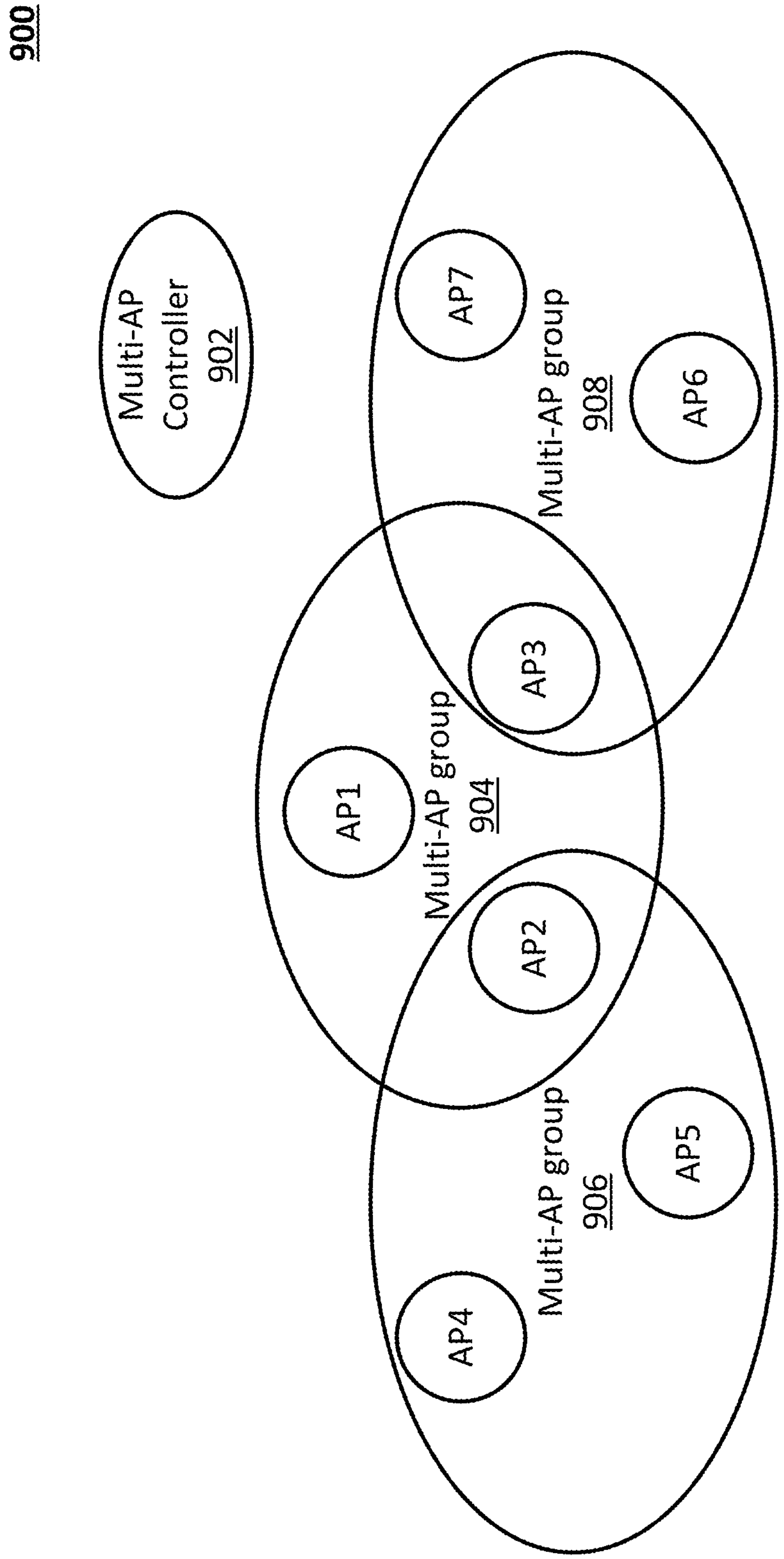
FIG. 9 illustrates an example multi-AP network.

FIG. 9 illustrates an example multi-AP network 900. Example multi-AP network 900 may be a multi-AP network in accordance with the Wi-Fi Alliance standard specification for multi-AP networks. As shown in FIG. 9, multi-AP network 900 may include a multi-AP controller 902 and a plurality of multi-AP groups (or multi-AP sets) 904, 906, and 908.

Multi-AP controller 902 may be a logical entity that implements logic for controlling the APs in multi-AP network 900. Multi-AP controller 902 may receive capability information and measurements from the APs and may trigger AP control commands and operations on the APs. Multi-AP controller 902 may also provide onboarding functionality to onboard and provision APs onto multi-AP network 900.

Multi-AP groups 904, 906, and 908 may each include a plurality of APs. APs in a multi-AP group are in communication range of each other. However, the APs in a multi-AP group are not required to have the same primary channel. As used herein, the primary channel for an AP refers to a default channel that the AP monitors for management frames and/or uses to transmit beacon frames. For a STA associated with an AP, the primary channel refers to the primary channel of the AP, which is advertised through the AP's beacon frames.

In one approach, one of the APs in a multi-AP group may be designated as a master AP. The designation of the master AP may be done by AP controller 902 or by the APs of the multi-AP group. The master AP of a multi-AP group may be fixed or may change over time among the APs of the multi-AP group. An AP that is not the master AP of the multi-AP group is known as a slave AP. In one approach, a master AP may be in communication range of all slave APs of the multi-AP group and vice versa. A slave AP may not be in communication range of another slave AP of the multi-AP group.

In one approach, APs in a multi-AP group may coordinate with each other, including coordinating transmissions within the multi-AP group. One aspect of coordination may include coordination to perform multi-AP transmissions within the multi-AP group. As used herein, a multi-AP transmission is a transmission event in which multiple APs (of a multi-AP group or a multi-AP network) transmit simultaneously over a time period. The time period of simultaneous AP transmission may be a continuous period. The multi-AP transmission may use different transmission techniques, such as Coordinated OFDMA, Coordinated Spatial Reuse, Joint Transmission and Reception, Coordinated Beamforming and Coordinated Time Division Multiple Access (TDMA), or a combination of two or more of the aforementioned techniques.

Multi-AP group coordination may be enabled by the AP controller and/or by the master AP of the multi-AP group. In one approach, the AP controller and/or the master AP may control time and/or frequency sharing in a TXOP. For example, when one of the APs (e.g., the master AP) in the multi-AP group obtains a TXOP, the AP controller and/or the master AP may control how time/frequency resources of the TXOP are to be shared with other APs of the multi-AP group. In an implementation, the AP of the multi-AP group that obtains a TXOP becomes the master AP of the multi-AP group. The master AP may then share a portion of its obtained TXOP (which may be the entire TXOP) with one or more other APs of the multi-AP group.

OFDMA is a transmission technique introduced in the IEEE 802.11ax standard amendment. OFDMA provides a multiple access scheme that allows multiple STAs to transmit frames simultaneously using non-overlapping (orthogonal) frequency subcarriers.

Figure 10:
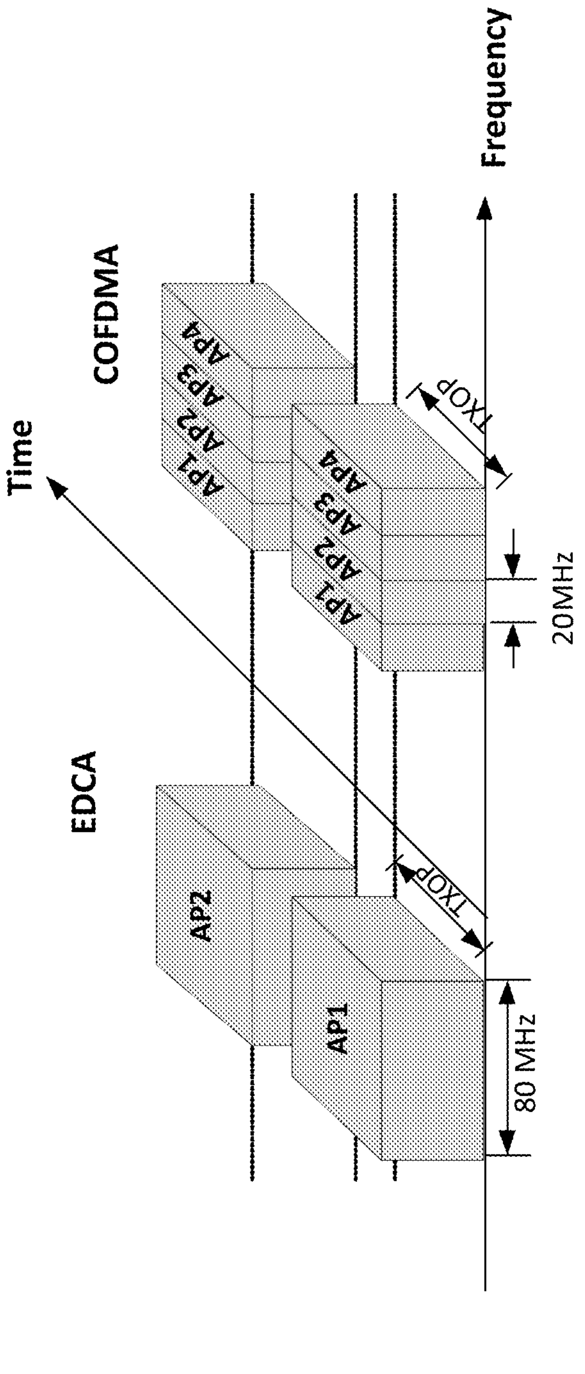
FIG. 10 illustrates Coordinated Orthogonal Frequency Division Multiple Access (C-OFDMA).

In coordinated OFDMA (C-OFDMA), it is envisaged that an AP (e.g., master AP) may coordinate a multi-AP transmission by multiple APs (which may or may not include the coordinating AP) by assigning each of the multiple APs a respective frequency resource (e.g., channel/subchannel) of available frequency resources for a transmission time period. The coordinating AP may further indicate transmit parameters (e.g., PPDU format, guard interval, symbol duration, etc.) for the multi-AP transmission. The multiple APs access the assigned frequency resources simultaneously, using OFDMA, during the transmission time period. FIG. 10 illustrates C-OFDMA as a multi-AP channel access, compared with Enhanced Distributed Channel Access (EDCA). As shown in FIG. 10, in EDCA, channel access by multiple APs (e.g., AP1, AP2) may occur in consecutive time periods (e.g., TXOPs). During a given channel access, the channel (e.g., 80 MHz) in its entirety may be used by a single AP. In contrast, in C-OFDMA, access by multiple APs (multi-AP channel access) may take place in a same time period (e.g., TXOP) over orthogonal frequency resources. For example, as shown in FIG. 10, an 80 MHz channel may be divided into four non-overlapping 20 MHz channels, each assigned to a respective AP of the multiple APs. The multiple APs may transmit, simultaneously in the same time period, to respective associated STAs, for example.

It is anticipated that future IEEE 802.11 standard drafts extend the existing TXS procedure described above to APs. In such a procedure (hereinafter referred to as an inter-AP TXS procedure), an AP (hereinafter referred to as a sharing AP) may allocate to one or more other APs (hereinafter referred to as shared AP(s)) a portion of time of an obtained TXOP. The shared AP(s) may use the allocated time to communicate with associated STA(s) and/or with the sharing AP without being triggered by the sharing AP. The sharing AP may or may not be part of the APs communicating during the allocated time.

Figure 11:
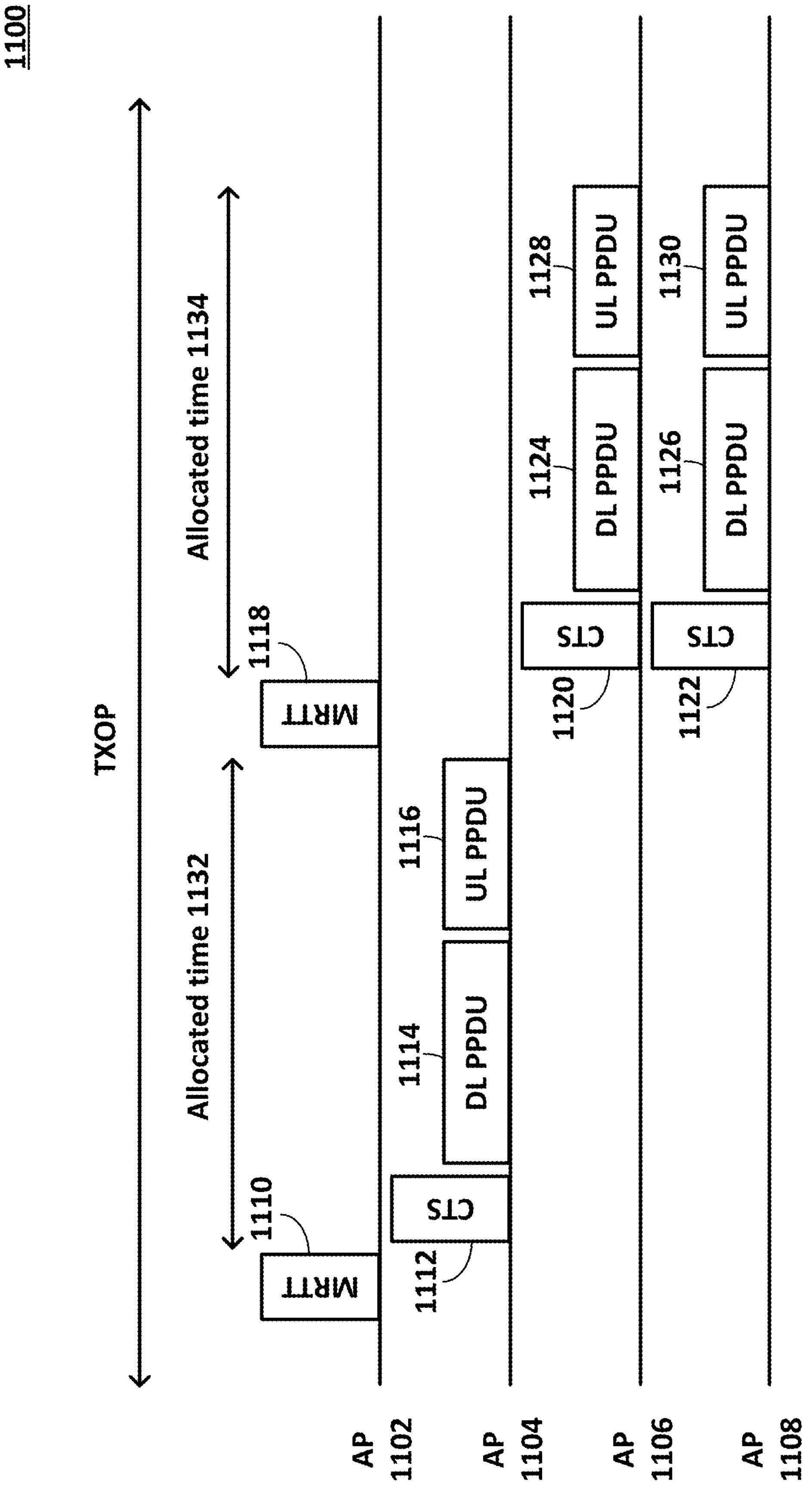
FIG. 11 is an example that illustrates an inter-AP TXS procedure.

FIG. 11 is an example 1100 that illustrates an inter-AP TXS procedure. As shown in FIG. 11, example 1100 includes APs 1102, 1104, 1106, and 1108. In an example APs 1102, 1104, 1106, and 1108 may form a multi-AP group as described above in FIG. 9. In an example, AP 1102 may be a master AP of the multi-AP group and APs 1104, 1106, and 1108 may be slave APs of the multi-AP group. However, the inter-AP TXS procedure described herein is not limited to use in a multi-AP group and/or in the presence of a master AP and of slave APs.

In example 1100, AP 1102 may obtain a TXOP. Subsequently, AP 1102 may initiate an inter-AP TXS operation by transmitting an MRTT frame 1110 to AP 1104. MRTT frame 1110 may have a similar format as MU-RTS trigger frame 600 described above. In an example, MRTT frame 1110 may indicate an identifier of AP 1104 (e.g., in an AID 12 subfield of a user info field of MRTT frame 1110) and an allocated time 1132 (e.g., in an allocation duration subfield of the user info field) of the TXOP. Additionally, MRTT frame 1110 may indicate a TXS mode (e.g., in a triggered TXOP sharing mode subfield of common info field of MRTT frame 1110). The TXS mode may indicate whether AP 1104 shall communicate with AP 1102 only during allocated time 1132 (e.g., when the TXS mode is set to 1) or whether AP 1104 may communicate with AP 1102 or another STA (e.g., an associated non-AP STA or another AP STA) during allocated time 1132.

AP 1104 may respond to MRTT frame 1110 by transmitting a CTS frame 1112 to AP 1102. Subsequently, e.g., a short interframe space (SIFS) after transmitting CTS frame 1112, AP 1104 may proceed, without trigger from AP 1102, to use allocated time 1132 for communication in accordance with the TXS mode indicated in MRTT frame 1110. In example 1100, the TXS mode may permit AP 1104 to communicate with AP 1102 or with another STA during allocated time 1132. As such, as shown in FIG. 11, AP 1104 may use allocated time 1132 to transmit a (non-TB) downlink (DL) PPDU 1114 to an associated STA (not shown in FIG. 11) and to receive an uplink (UL) PPDU 1116 from an associated STA (not shown in FIG. 11).

In an example, with time remaining of the TXOP, AP 1102 may initiate another inter-AP TXS operation by transmitting an MRTT frame 1118 to APs 1106 and 1108. MRTT frame 1118 may have a similar format as MU-RTS trigger frame 600 described above. In an example, MRTT frame 1118 may indicate identifiers of APs 1106 and 1108 (e.g., in respective AID 12 subfields of respective user info fields of MRTT frame 1118) and an allocated time 1134 (e.g., in respective allocation duration subfields of the user info fields) of the TXOP. Additionally, MRTT frame 1118 may indicate a TXS mode (e.g., in a triggered TXOP sharing mode subfield of common info field of MRTT frame 1118). The TXS mode may indicate whether APs 1106 and 1108 shall communicate with AP 1102 only during allocated time 1134 (e.g., when the TXS mode is set to 1) or whether APs 1106 and 1108 may communicate with AP 1102 or other STAs (e.g., an associated non-AP STA or another AP STA) during allocated time 1134.

APs 1106 and 1108 may respond to MRTT frame 1118 by transmitting CTS frames 1120 and 1122 respectively to AP 1102. Subsequently, e.g., a SIFS after transmitting respectively CTS frames 1120 and 1122, APs 1106 and 1108 may proceed, without trigger from AP 1102, to use allocated time 1134 for communication in accordance with the TXS mode indicated in MRTT frame 1118. In example 1100, the TXS mode may permit APs 1106 and 1108 to communicate with AP 1102 or with another STA during allocated time 1134. As such, as shown in FIG. 11, AP 1104 may use allocated time 1134 to transmit a (non-TB) DL PPDU 1124 to an associated STA (not shown in FIG. 11) and to receive an UL PPDU 1128 from an associated STA (not shown in FIG. 11). Similarly, AP 1108 may use allocated time 1134 to transmit a (non-TB) DL PPDU 1126 to an associated STA (not shown in FIG. 11) and to receive an UL PPDU 1130 from an associated STA (not shown in FIG. 11).

In an example, C-OFDMA may be used for the transmission of DL PPDUs 1124 and 1126 and UL PPDUs 1128 and 1130. Specifically, AP 1102 may assign APs 1106 and 1108 respective frequency resources that are orthogonal to each other for allocated time 1134. For example, AP 1102 may divide an 80 MHz channel into two non-overlapping 40 MHz channels, each assigned to a respective one of APs 1106 and 1108. In an example, the frequency resources assigned to an AP are indicated in an RU allocation subfield of a user info field (that indicates the identifier of the AP) of MRTT frame 1118. DL PPDU 1124 and UL PPDU 1128 may thus be transmitted on RUs that are orthogonal to the RUs used for the transmission of DL PPDU 1126 and UL PPDU 1130.

Figure 12:
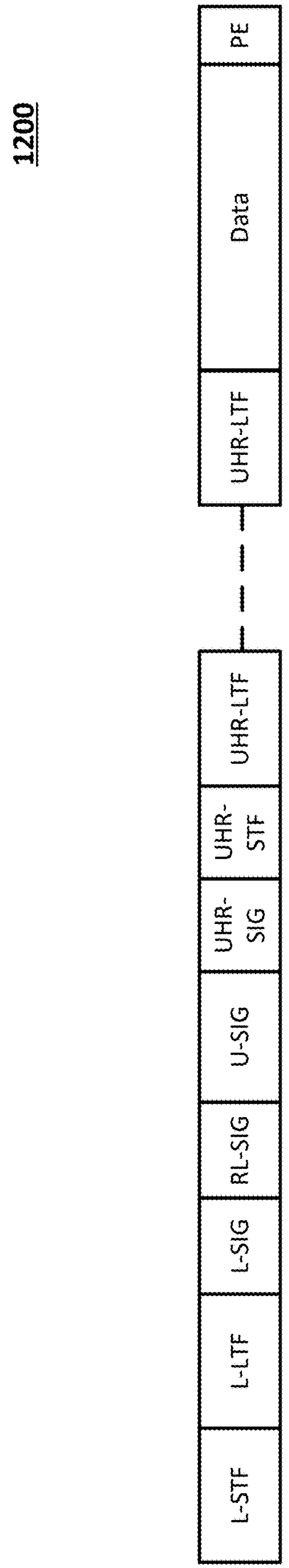
FIG. 12 illustrates an example physical layer protocol data unit (PPDU) which may be used for a downlink (DL) PPDU or an uplink (UL) PPDU.

FIG. 12 illustrates an example PPDU 1200 which may be used for a downlink DL PPDU or an UL PPDU. For example, PPDU 1200 may be an embodiment of DL PPDU 1114, 1124, or 1126 or of UL PPDU 1116, 1128, or 1130 described in FIG. 11. PPDU 1200 may be an Ultra-High Reliability (UHR) PPDU which may be used by devices conforming to the IEEE 802.11bn standard amendment. Such devices may operate in the 2.4, 5, and 6 GHz bands. In an implementation, PPDU 1200 may be transmitted over a bandwidth of up to 320 MHz. PPDU 1200 may be used by a device for both single user (SU) and multi-user (MU) transmissions. It is noted that UHR may be called a different name (e.g., Ultra-High Throughput (UHR) or Ultra-High Efficiency (UHE)).

As shown in FIG. 12, PPDU 1200 includes an non-HT Short Training field (L-STF), a non-HT Long Training field (L-LTF), a non-High-Throughput (non-HT) Signal field (L-SIG), a non-HT Repeated Signal field (RL-SIG), a Universal Signal field (U-SIG), a UHR Signal field (UHR-SIG), a UHR Short Training field (UHR-STF) field, one or more UHR Long Training field (UHR-LTF), a data field, and a Packet Extension (PE) field.

The L-STF is used by a receiver of PPDU 1200 to synchronize with the carrier frequency and frame timing of a transmitter of PPDU 1200 and to adjust the receiver signal gain.

The L-LTF is used by the receiver of PPDU 1200 to estimate channel coefficients in order to equalize the channel response (e.g., amplitude and phase distortion) in both Signal fields (L-SIG, RL-SIG, U-SIG, UHR-SIG) and the data field of PPDU 1200.

The L-SIG and RL-SIG contain parameters needed to demodulate the data field. The L-SIG may be equalized using the channel coefficients estimated using the L-LTF and demodulated to obtain the demodulation parameters of the data field.

The U-SIG ensures forward compatibility of PPDU 1200. This means that any future PPDUs that are backward compatible to IEEE 802.11bn will contain the same U-SIG field. Because of this, IEEE 802.11bn conforming devices will be able to understand at least in part a PPDU developed in a future amendment, provided those amendments contain the U-SIG field as well.

The UHR-SIG contains indications per STA of resource unit (RU) allocations. A receiving STA may use the indications in the UHR-SIG to locate its payload in the data field of PPDU 1200.

The L-SIG, RL-SIG, U-SIG, and UHR-SIG fields may be considered as a PHY Header of PPDU 1200.

The UHR-STF and the one or more UHR-LTFs are used by the receiver of PPDU 1200 to estimate channel coefficients in order to equalize the channel response (e.g., amplitude and phase distortion) in the data field of PPDU 1200.

The data field contains one or more payloads carried by PPDU 1200. The one or more payloads may comprise MPDUs.

The PE field is an extension of PPDU 1200 designed to give the receiver of PPDU 1200 sufficient time to respond after receiving PPDU 1200.

Figure 13:
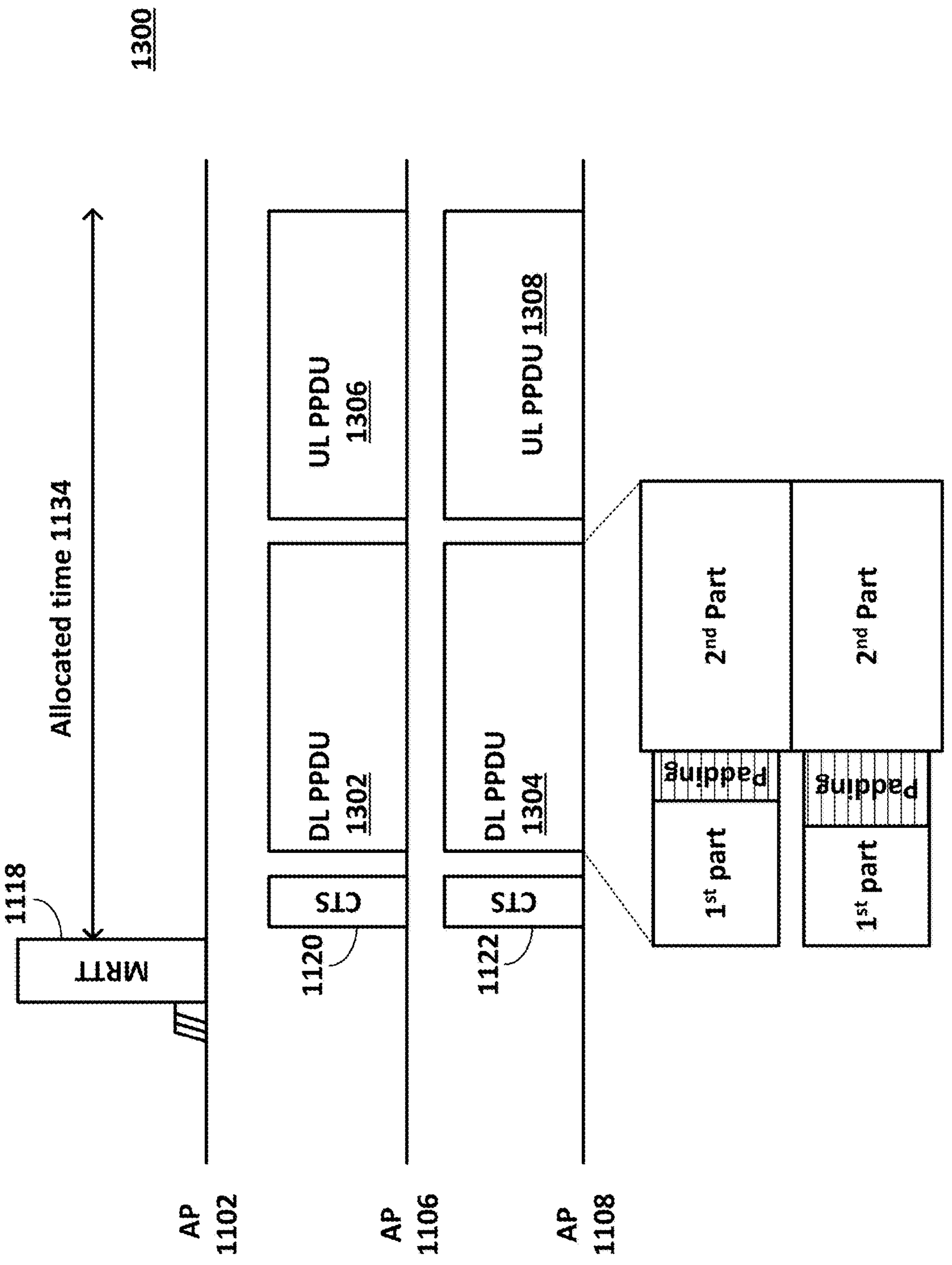
FIG. 13 is an example that illustrates a problem that may arise in the inter-AP TXS procedure illustrated in FIG. 11.

FIG. 13 is an example 1300 that illustrates a problem that may arise in the inter-AP TXS procedure illustrated in FIG. 11. As shown in FIG. 13, example 1300 includes APs 1102, 1106, and 1108 described above. As in example 1100, AP 1102 initiates an inter-AP TXS operation by transmitting MRTT frame 1118 to APs 1106 and 1108. MRTT frame 1118 may have a similar format as MU-RTS trigger frame 600 described above. In an example, MRTT frame 1118 may indicate identifiers of APs 1106 and 1108 (e.g., in respective AID 12 subfields of respective user info fields of MRTT frame 1118) and allocated time 1134 (e.g., in respective allocation duration subfields of the user info fields) of the TXOP. Additionally, MRTT frame 1118 may indicate a TXS mode (e.g., in a triggered TXOP sharing mode subfield of common info field of MRTT frame 1118). The TXS mode may indicate whether APs 1106 and 1108 shall communicate with AP 1102 only during allocated time 1134 (e.g., when the TXS mode is set to 1) or whether APs 1106 and 1108 may communicate with AP 1102 or other STAs (e.g., an associated non-AP STA or another AP STA) during allocated time 1134.

APs 1106 and 1108 respond to MRTT frame 1118 by transmitting CTS frames 1120 and 1122 respectively to AP 1102. Subsequently, e.g., a SIFS after transmitting respectively CTS frames 1120 and 1122, APs 1106 and 1108 may proceed, without trigger from AP 1102, to use allocated time 1134 for communication in accordance with the TXS mode indicated in MRTT frame 1118. In example 1300, the TXS mode may permit APs 1106 and 1108 to communicate with AP 1102 or with another STA during allocated time 1134. As such, as shown in FIG. 13, AP 1104 may use allocated time 1134 to transmit a DL PPDU 1302 to an associated STA (not shown in FIG. 13) and to receive an UL PPDU 1306 from an associated STA (not shown in FIG. 13). Similarly, AP 1108 may use allocated time 1134 to transmit a DL PPDU 1304 to an associated STA (not shown in FIG. 13) and to receive an UL PPDU 1308 from an associated STA (not shown in FIG. 13).

In an example, C-OFDMA may be used for the transmission of DL PPDUs 1302 and 1304 and UL PPDUs 1306 and 1308. Specifically, AP 1102 may assign APs 1106 and 1108 respective frequency resources that are orthogonal to each other for allocated time 1134. For example, AP 1102 may divide an 80 MHz channel into two non-overlapping 40 MHz channels, each assigned to a respective one of APs 1106 and 1108. In an example, the frequency resources assigned to an AP are indicated in an RU allocation subfield of a user info field (that indicates the identifier of the AP) of MRTT frame 1118. DL PPDU 1302 and UL PPDU 1306 may thus be transmitted on RUs that are orthogonal to the RUs used for the transmission of DL PPDU 1304 and UL PPDU 1308.

As APs 1106 and 1108 are not triggered by AP 1102 during allocated time 1134, AP 1102 may indicate in MRTT frame 1118 a first time period, within allocated time 1134, for the DL transmission and/or a second time period, within allocated time 1134, for the UL transmission. APs 1106 and 1108 may use the first time period to transmit DL PPDUs 1302 and 1304, respectively. Similarly, APs 1106 and 1108 may use the second time period to receive UL PPDUs 1306 and 1308, respectively. The first and second time periods aid in the time-alignment of DL PPDUs 1302 and 1304 and of UL PPDUs 1306 and 1308, as shown in FIG. 13, and reduce potential OFDM symbol misalignment at a receiver receiving one of PPDUs 1302, 1304, 1306, or 1308. OFDM symbol misalignment results in the boundaries of OFDM symbols received over a first portion (e.g., a first 40 MHz) of the channel and the boundaries of corresponding OFDM symbols received over a second portion (e.g., a second 40 MHz) of the channel being out of sync. As the receiver typically receives and processes the entire channel (in the absence of a dedicated receive filter per sub-channel), the receiver may be unable to decode a PPDU where the OFDM symbol misalignment occurs.

However, in some implementations, indication of the first time period and/or the second time period by AP 1102 may not be sufficient to achieve OFDM symbol alignment between DL PPDUs 1302 and 1304 and/or between UL PPDUs 1306 and 1308. For example, in an implementation, each of DL PDDUs 1302 and 1304 may be composed of a first part and a second part. The first part may comprise a first set of fields of the DL PPDU, and the second part may comprise a second set of fields of the DL PPDU. In an implementation, one or more of the first set of fields of the first part may include information regarding one or more of the second fields of the second part. The length of the first part may thus impact the length of the second part, and vice versa. In an implementation, the first part and the second part may use different OFDM symbol durations. Alignment of DL PPDUs 1302 and 1304 may thus further require time-alignment of the first parts of DL PPDUs 1302 and 1304 and time-alignment of the second parts of DL PPDUs 1302 and 1304. The same may also be applicable for UL PPDUs 1306 and 1308 such that alignment of UL PPDUs 1306 and 1308 may further require time-alignment of the first parts of UL PPDUs 1306 and 1308 and time-alignment of the second parts of UL PPDUs 1306 and 1308.

In an implementation, AP 1102 may indicate, in addition to the first time period for the DL transmission, a third time period (within the first time period) for a first part of the DL transmission. The third time period may be used for transmission of the first parts of DL PPDUs 1302 and 1304. In an implementation, AP 1102 may indicate, in addition to the second time period for the UL transmission, a fourth time period (within the second time period) for a second part of the UL transmission. The fourth time period may be used for transmission of the second parts of UL PPDUs 1306 and 1308.

However, without knowledge of the characteristics of the downlink data that each of APs 1106 and 1108 intend to transmit during the DL transmission, the third period set by AP 1102 may be suboptimal and may result in DL resources being wasted. For example, as shown in FIG. 13, AP 1102 may set the third time period for the DL transmission in a manner that substantially exceeds the DL transmission needs of APs 1106 and/or 1108. As such, both APs 1106 and 1108 may have to resort to padding in order to time-align the first parts of DL PPDUs 1302 and 1304 and the second parts of DL PPDUs 1302 and 1304. In another example, the third time period may be set too short for the DL transmission needs of APs 1106 and/or 1108. As the length of the first parts (transmitted during to the third time period) may impact the length of the second parts (transmitted during the fourth time period), a third time period that is too short and that limits the length of the first parts DL PPDUs 1302 and 1304 may also limits the length of the second parts DL PPDUs 1302 and 1304. This may result in the fourth time being too long for the second parts of DL PPDUs 1302 and 1304, and AP 1106 and 1108 may have to resort to padding for the second parts of DL PPDUs 1302 and 1304 to ensure time-alignment of DL PPDUs 1302 and 1304. The same problem may also arise for UL PPDUs 1306 and 1308. Namely, without knowledge of the characteristics of the uplink data that each of APs 1106 and 1108 intend to receive during the UL transmission, AP 1102 may set the fourth time period for the UL transmission in a manner that may be suboptimal and that may result in UL resources being wasted.

Embodiments of the present disclosure, as further described below, address the above-discussed problem that may arise in inter-AP TXS procedure. In one aspect, a first AP may transmit to a second AP a first frame indicating a number of STAs, associated with the first AP, for a DL transmission from the second AP. The STAs which number is indicated in the first frame may be STAs that the first AP intends or wishes to transmit to in the DL transmission. The first AP may be a shared AP and the second AP may be a sharing AP. The DL transmission may be a part of a multi-AP transmission coordinated/initiated by the second AP. The multi-AP transmission may be performed within an allocated time of a TXOP obtained by the second AP. The second AP may transmit to the first AP a second frame indicating a time period for a first part of a DL PPDU for the DL transmission. In an embodiment, the time period for the first part of the DL PPDU is based on the number of STAs indicated in the first frame. In another aspect, the first AP may transmit to the second AP a first frame indicating a duration of a first part of DL PPDU for a DL transmission from the first AP to one or more STAs associated with the first AP. The first AP may receive from the second AP a second frame indicating a time period for the first part of the DL PPDU. In an embodiment, the time period is based on the duration indicated in the first frame. Further aspects and details of embodiments are presented in the example embodiments described below.

Figure 14:
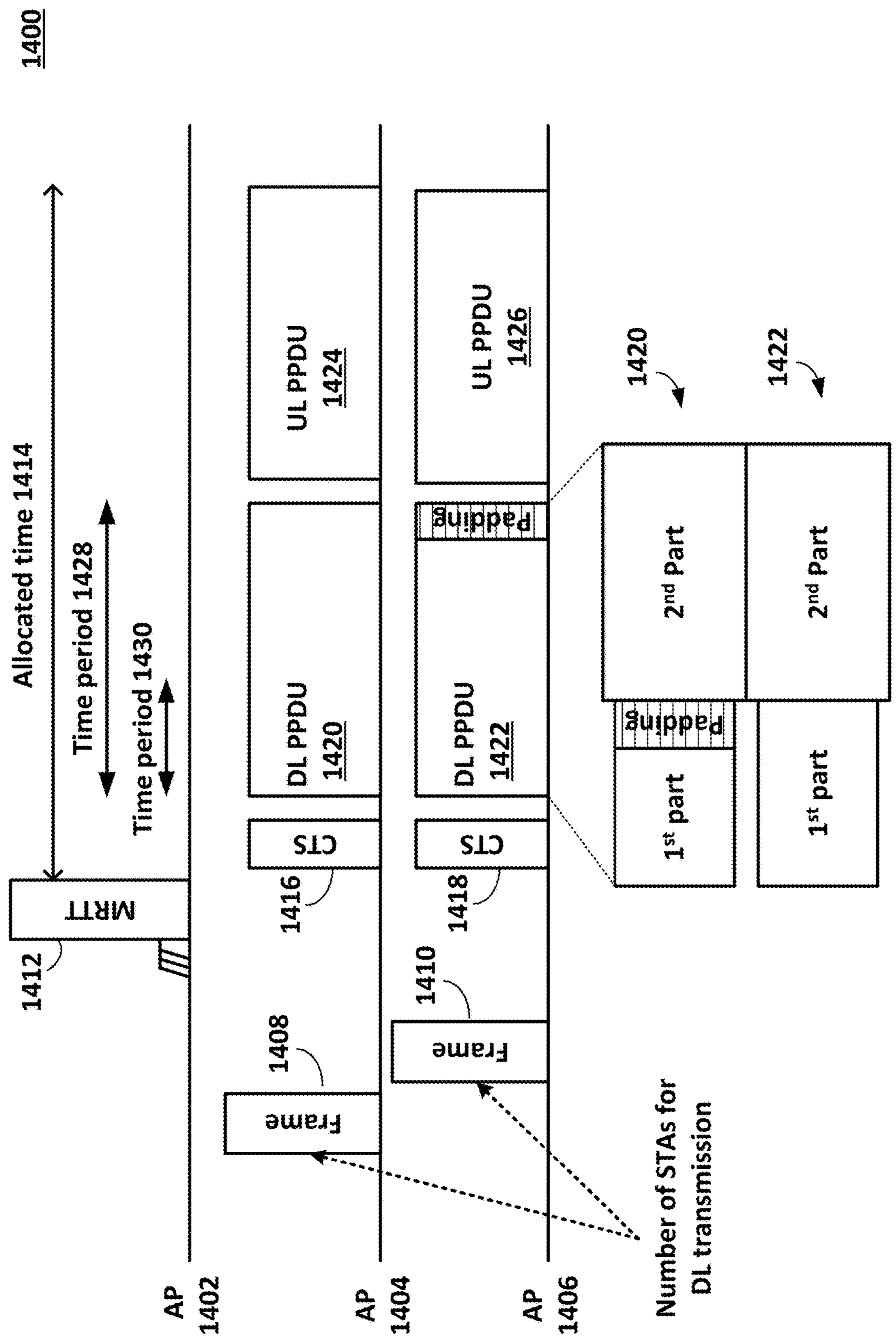
FIG. 14 illustrates an example of an inter-AP TXS procedure according to an embodiment.

FIG. 14 illustrates an example 1400 of an inter-AP TXS procedure according to an embodiment. As shown in FIG. 14, example 1400 includes APs 1402, 1404, and 1406. In an example APs 1402, 1404, and 1406 may form a multi-AP group as described above in FIG. 9. In an example, AP 1402 may be a sharing AP (or a master AP) of the multi-AP group and APs 1404 and 1406 may be shared APs (or slave APs) of the multi-AP group. However, the inter-AP TXS procedure described herein is not limited to use in a multi-AP group and/or in the presence of a sharing AP (or a master AP) and of shared AP (or slave APs).

As shown in FIG. 14, example 1400 may begin with AP 1404 transmitting a frame 1408 to AP 1402. In an embodiment, frame 1408 may indicate a number of STAs, associated with AP 1404, for a DL transmission from AP 1404. The STAs which number is indicated in frame 1408 may be STAs that AP 1404 intends or wishes to transmit to in the DL transmission. The DL transmission from AP 1404 may be a part of a multi-AP transmission. The multi-AP transmission may be performed within an allocated time of a TXOP obtained by AP 1402. The multi-AP transmission may be performed in the context of an inter-AP TXS procedure as described above. The multi-AP transmission may or may not comprise AP 1402. The multi-AP transmission may be a coordinated DL PPDU transmission by AP 1402 and one or more of APs 1404 and 1406. Alternatively, as shown in FIG. 14, the multi-AP transmission may be a coordinated DL PPDU transmission by APs 1404 and 1406. The coordinated DL PPDU transmission may comprise a C-OFDMA transmission, a coordinated spatial reuse (C-SR) transmission, a coordinated beamforming (C-BF), or a coordinated joint transmission.

In an embodiment, frame 1408 further indicates a DL transmission parameter for transmission of the first part of a DL PPDU for the DL transmission. In an embodiment, the DL transmission parameter may include/indicate one or more of an MCS, a bandwidth (BW) size, an RU size, a PPDU type, or a number of spatial streams (Nss) for the transmission of the first part.

In an embodiment, where the DL transmission parameter includes/indicates an MCS, frame 1408 may include an MCS index. In another embodiment, in addition to the MCS index, frame 1408 may indicate a PPDU type/format (e.g., HT, HE, VHT, EHT, UHR, etc.). In a further embodiment, frame 1408 may further indicate a requested bandwidth (e.g., 20 MHz, 40 MHz, etc.) for the DL transmission. In an embodiment, frame 1408 may indicate a plurality of MCS indices for a plurality of bandwidth values for the DL transmission.

In an embodiment, the DL transmission parameter may be determined by AP 1404. The DL transmission parameter may be selected by AP 1404 from a plurality of DL transmission parameters. The plurality of DL transmission parameters may be pre-configured in AP 1404. In an example, the DL transmission parameter may be suggested by AP 1404 for the DL transmission. For example, the DL transmission parameter may be a preferred parameter for the DL transmission.

In another embodiment, frame 1408 may indicate a duration for a first part of a DL PPDU for the DL transmission from AP 1404.

In another embodiment, frame 1408 may indicate a duration for a first field within the first part of the DL PPDU for the DL transmission from AP 1404. For example, frame 1408 may indicate a duration for a UHR-SIG field within the first part of the DL PPDU. The UHR-SIG field may be the first field within the first part of the DL PPDU.

Figure 16:
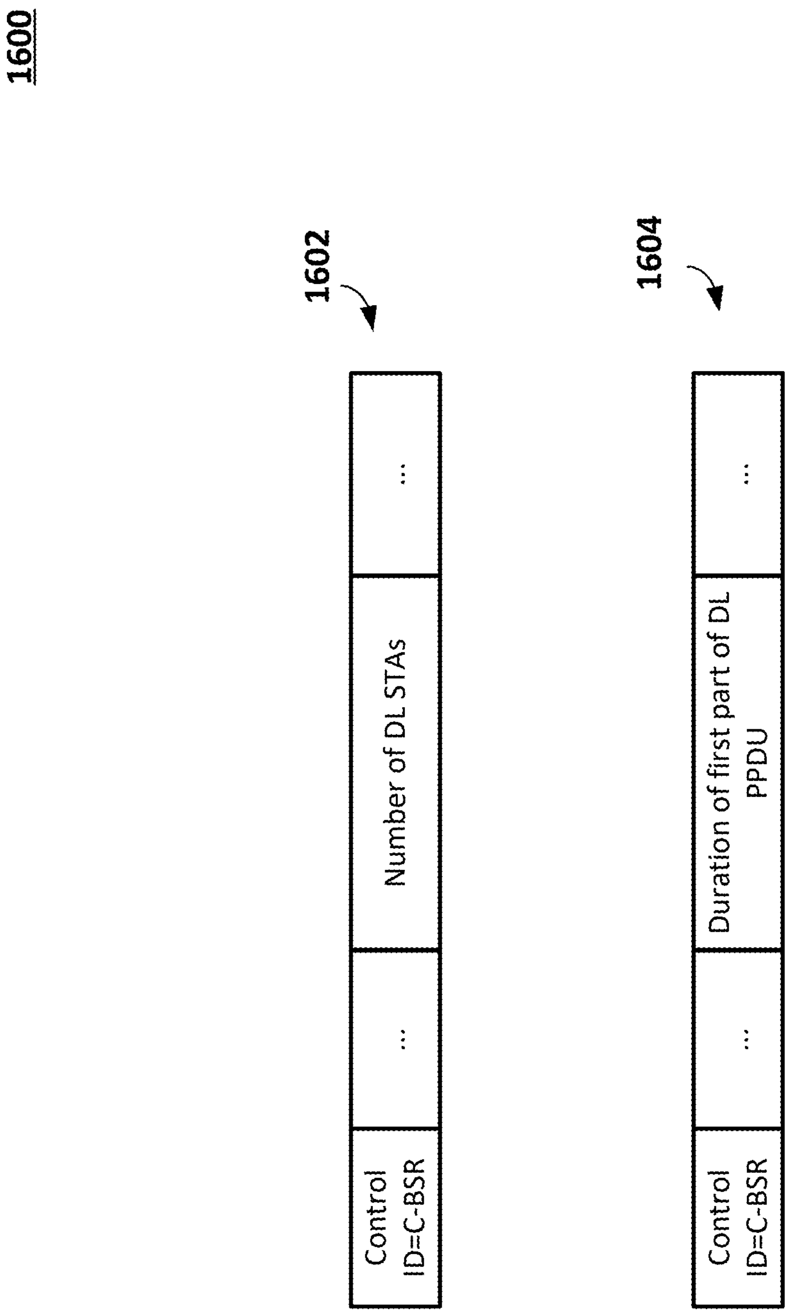
FIG. 16 illustrates example aggregated control (A-Control) fields which may be used in embodiments.
Figure 17:
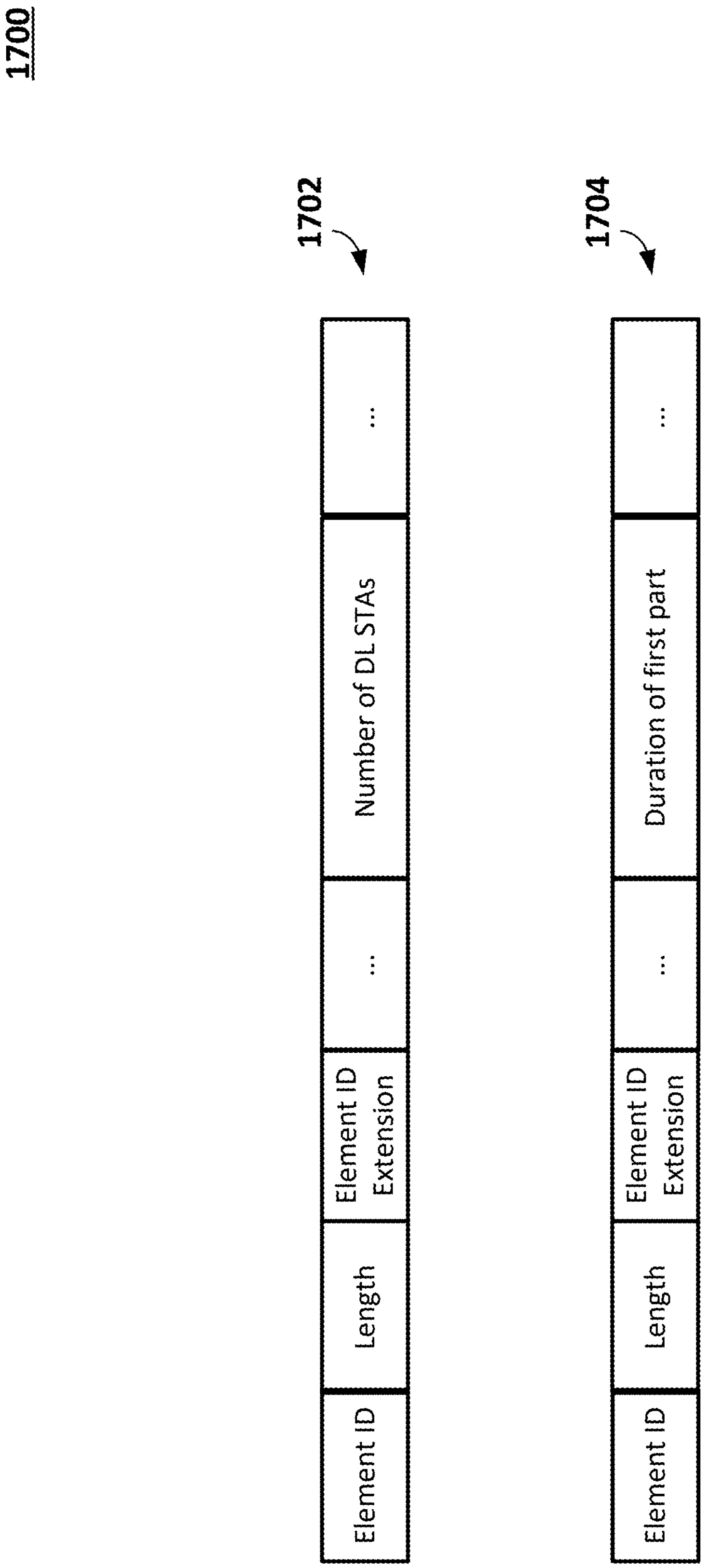
FIG. 17 illustrates example information elements which may be used in embodiments.

In an embodiment, frame 1408 may be a QoS data/null frame or an action frame, for example. When frame 1408 is a QoS data/null frame, the QoS data/null frame may comprise an aggregated control (A-Control) field comprising the number of STAs and/or the duration of the first part of the DL PPDU (and/or the duration of a field of the first part of the DL PPDU) as illustrated in FIG. 16, for example. When frame 1408 is an action frame, the action frame may comprise an information element (or an information field) comprising the number of STAs and/or the duration of the first part of the DL PPDU (and/or the duration of a field of the first part of the DL PPDU). The information element is illustrated in FIG. 17, for example.

In an embodiment, frame 1408 may further comprise a DL buffer status report (BSR). The DL BSR may indicate an amount of traffic buffered for DL transmission at AP 1404. The DL BSR may indicate the amount of buffered traffic as described with reference to FIG. 4 above (e.g., in a queue size subfield). In an implementation, the buffered traffic may correspond to all traffic buffered for DL transmission at AP 1404. In another implementation, the buffered traffic may correspond to the traffic buffered for DL transmission to the one or more STAs which number is indicated in frame 1408. Additionally, or alternatively, the buffered traffic may correspond to the traffic buffered for DL transmission for a particular access category (AC) or TID.

In an example, example 1400 may also include AP 1406 transmitting a frame 1410 to AP 1402. Frame 1410 may be transmitted before or after frame 1408. In an embodiment, frame 1410 may indicate a number of STAs, associated with AP 1406, for a DL transmission from AP 1406. The DL transmission from AP 1406 may be a part of a multi-AP transmission comprising the DL transmission from AP 1404. Frame 1410 is similar to frame 1408. The same description above regarding frame 1408 applies to frame 1410.

Subsequently, AP 1402 may obtain a TXOP and may initiate an inter-AP TXS operation by transmitting an MRTT frame 1412 to APs 1404 and 1406. MRTT frame 1412 may have a similar format as MU-RTS trigger frame 600 described above. In an example, MRTT frame 1412 may indicate identifiers of APs 1404 and 1406 (e.g., in respective AID 12 subfields of respective user info fields of MRTT frame 1412) and an allocated time 1414 (e.g., in respective allocation duration subfields of the user info fields) of the TXOP. Additionally, MRTT frame 1412 may indicate a TXS mode (e.g., in a triggered TXOP sharing mode subfield of common info field of MRTT frame 1412). The TXS mode may indicate whether APs 1404 and 1406 shall communicate with AP 1402 only during allocated time 1414 (e.g., when the TXS mode is set to 1) or whether APs 1404 and 1406 may communicate with AP 1402 or other STAs (e.g., an associated non-AP STA or another AP STA) during allocated time 1414.

In an embodiment, MRTT frame 1412 may further indicate a time period 1428, within allocated time 1414, for a multi-AP transmission. The multi-AP transmission may or may not comprise AP 1402. The multi-AP transmission may be a coordinated DL PPDU transmission by AP 1402 and one or more of APs 1404 and 1406. Alternatively, as shown in FIG. 14, the multi-AP transmission may be a coordinated DL PPDU transmission by APs 1404 and 1406. The coordinated DL PPDU transmission may comprise a C-OFDMA transmission, a coordinated spatial reuse (C-SR) transmission, a coordinated beamforming (C-BF), or a coordinated joint transmission. In an embodiment, the multi-AP transmission may be in response to frames 1408 and 1410 from APs 1404 and 1406, respectively, signaling information for respective DL transmissions from APs 1404 and 1406.

In an embodiment, MRTT frame 1412 may further indicate a time period 1430 for a first part of a DL PPDU for the DL transmission from AP 1404 and/or the DL transmission from AP 1406. In an embodiment, time period 1430 may be based on the number of STAs indicated in frame 1408 and/or the number of STAs indicated in frame 1410. In an embodiment, time period 1430 corresponds to a transmission duration of the first part of the DL PPDU. In another embodiment, time period 1430 may be further based on the DL transmission parameter indicated in frame 1408 and/or frame 1410.

In an example, the DL PPDU may have a format as illustrated in FIG. 12. In an embodiment, the first part may comprise one or more of: the L-STF, the L-LTF, the L-SIG, the RL-SIG, the U-SIG, and the UHR-SIG of the DL PPDU. In an example, the first part comprises the L-STF, the L-LTF, the L-SIG, the RL-SIG, the U-SIG, and the UHR-SIG of the DL PPDU. In another embodiment, first part may comprise one or more of: the L-STF, the L-LTF, the L-SIG, the RL-SIG, the U-SIG, the UHR-SIG, the UHR-STF, and the UHR-LTF of the DL PPDU. In an example, the first part comprises the L-STF, the L-LTF, the L-SIG, the RL-SIG, the U-SIG, the UHR-SIG, the UHR-STF, and the UHR-LTF of the DL PPDU.

In an embodiment, AP 1402 may determine a first length for the first part of the DL PPDU based on the number of STAs indicated in frame 1408. In an embodiment, AP 1402 may determine a second length for the first part of the DL PPDU based on the number of STAs indicated in frame 1410. In an example, based on the number of STAs indicated in frame 1408/1410, AP 1402 may determine the required size (e.g., number of OFDM symbols) of one or more fields of the first part which size varies with the number of STAs being served by the DL PPDU. For example, the UHR-SIG field may comprise a common field and a user specific field. The user specific field may comprise N user fields (N=1, 2, 3, . . . ) based on the number of STAs being served by the DL PPDU. In another example, AP 1402 may determine the number/size of UHR-LTFs required for the DL PPDU.

In an embodiment, AP 1402 may determine a first duration based on the first length of the first part of the DL PPDU. In an embodiment, AP 1402 may determine a second duration based on the second length of the first part of the DL PPDU. In an embodiment, AP 1402 may select the larger of the first duration and the second duration as time period 1430. As such, time period 1430 is guaranteed to be sufficiently long to accommodate the DL traffic requirements of both APs 1404 and 1406. In another embodiment, time period 1430 may be subject to a maximum duration for the first part of the PPDU. That is, time period 1430 may not exceed the maximum duration. In another embodiment, AP 1402 may select the shorter of the first duration and the second duration as time period 1430. This ensures that time period 1430 can be fully utilized by at least one of APs 1404 and 1406.

In an embodiment, MRTT frame 1412 may comprise a duration of time period 1430. In an embodiment, a start time of time period 1430 may be determined based on MRTT frame 1412. For example, the start time of time period 1430 may be 2 SIFS plus a CTS frame transmission time from the time of receiving MRTT frame 1412. An end time of time period 1430 may be determined based on the start time and the indicated duration.

In another embodiment, MRTT frame 1412 may comprise a start time and an end time of time period 1430, a start time and a duration of time period 1430, or a duration and an end time of time period 1430. In such an embodiment, the start time of time period 1430 may not be based on MRTT frame 1412.

In another embodiment, MRTT frame 1412 may indicate time period 1430 as a segment of allocated time 1414. For example, MRTT frame 1412 may indicate that time period 1430 corresponds to a first half/third/quarter of allocated time 1414, or a first X microseconds of allocated time 1414, etc.

In another embodiment, MRTT frame 1412 may indicate time period 1430 by indicating a number of OFDM symbols (of a given duration in accordance with OFDM symbols of the first part, e.g., 4 microseconds) to be transmitted during time period 1430.

In other embodiments, AP 1402 may initiate the inter-AP TXS operation by transmitting a frame other than an MRTT frame. For example, AP 1402 may use a multi-AP trigger frame for initiating the inter-AP TXS operation. The multi-AP trigger frame may comprise/indicate the same information described above as comprised/indicated in MRTT frame 1412. APs 1404 and 1406 may or may not respond to or acknowledge the multi-AP trigger frame from AP 1402.

As shown in FIG. 14, APs 1404 and 1406 may respond to MRTT frame 1412 by transmitting CTS frames 1416 and 1418 respectively to AP 1402. Subsequently, e.g., a SIFS after transmitting respectively CTS frames 1416 and 1418, APs 1404 and 1406 may proceed, without trigger from AP 1402, to use allocated time 1414 for communication in accordance with the TXS mode indicated in MRTT frame 1412 and with account for time period 1428. In example 1400, the TXS mode may permit APs 1404 and 1406 to communicate with AP 1402 or with another STA during allocated time 1414. As such, as shown in FIG. 14, AP 1404 may use time period 1428 of allocated time 1414 to transmit a (non-TB) DL PPDU 1420 to an associated STA (not shown in FIG. 14). In transmitting DL PPDU 1420, AP 1404 may use time period 1430 for a first part of DL PPDU 1420. AP 1404 may insert padding bits at the end of the first part to make sure that the transmission duration of the first part is equal to time period 1430. The padding bits may be inserted in the middle of the first part. For example, the padding bits may be added at the end of a UHR-SIG field of the first part or within the UHR-SIG or right before a CRC field of the UHR-SIG field. Similarly, AP 1406 may use time period 1428 to transmit a (non-TB) DL PPDU 1422 to an associated STA (not shown in FIG. 14). In transmitting DL PPDU 1422, AP 1404 may use time period 1430 for a first part of DL PPDU 1422. With the time period 1430 set by AP 1402 as described above, AP 1406 may not need to insert any padding bits at the end of the first part of DL PPDU 1422 and may utilize time period 1430 in its entirety for transmission of the first part of DL PPDU 1422. Utilization of allocated time 1414, and particularly time period 1430, is therefore increased.

In an example, AP 1404 may use a remaining duration of allocated time 1414, in accordance with any indication in MRTT frame 1412, to receive an UL PPDU 1424 from an associated STA (not shown in FIG. 14). In an example, AP 1406 may use a remaining duration of allocated time 1414, in accordance with any indication in MRTT frame 1412, to receive an UL PPDU 1426 from an associated STA (not shown in FIG. 14). In an embodiment, as described above, frame 1412 may further indicate a time period for a first part of UL PPDUs 1424 and 1426. In an embodiment, AP 1404 may signal the time period to its associated STA scheduled to transmit UL PPDU 1424. In an embodiment, AP 1406 may signal the time period to its associated STA scheduled to transmit UL PPDU 1426.

In an example, C-OFDMA may be used for the transmission of DL PPDUs 1420 and 1422 and UL PPDUs 1424 and 1426. Specifically, AP 1402 may assign APs 1404 and 1406 respective frequency resources that are orthogonal to each other for allocated time 1414. For example, AP 1402 may divide an 80 MHz channel into two non-overlapping 40 MHz channels, each assigned to a respective one of APs 1404 and 1406. In an example, the frequency resources assigned to an AP are indicated in an RU allocation subfield of a user info field (that indicates the identifier of the AP) of MRTT frame 1412. DL PPDU 1420 and UL PPDU 1424 may thus be transmitted on RUs that are orthogonal to the RUs used for the transmission of DL PPDU 1422 and UL PPDU 1426.

Figure 15:
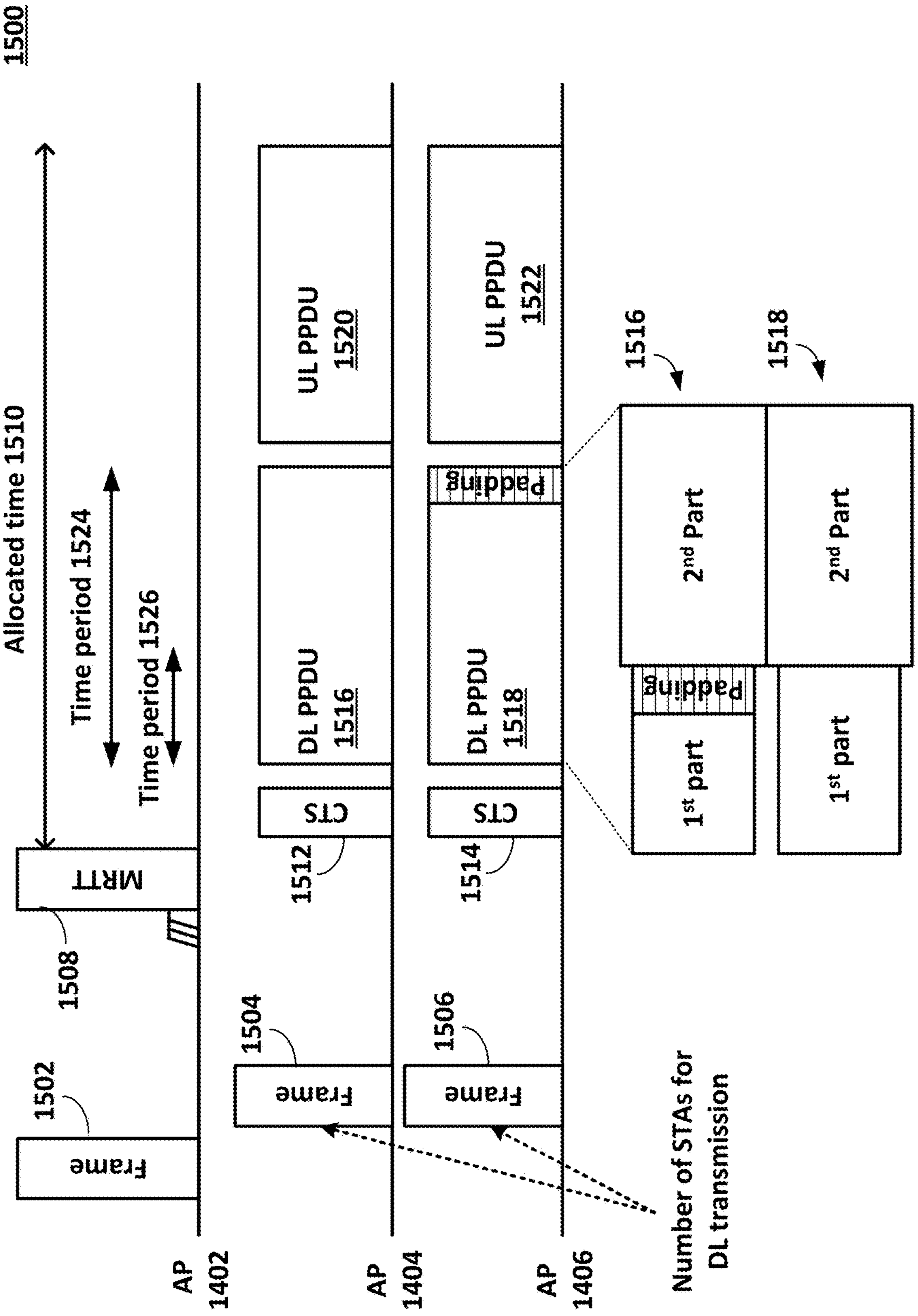
FIG. 15 illustrates an example of an inter-AP TXS procedure according to another embodiment.

FIG. 15 illustrates an example 1500 of an inter-AP TXS procedure according to another embodiment. As shown in FIG. 15, example 1500 also includes APs 1402, 1404, and 1406 described above with reference to FIG. 14. In an example APs 1402, 1404, and 1406 may form a multi-AP group as described above in FIG. 9. In an example, AP 1402 may be a sharing AP (or a master AP) of the multi-AP group and APs 1404 and 1406 may be shared APs (or slave APs) of the multi-AP group. However, the inter-AP TXS procedure described herein is not limited to use in a multi-AP group and/or in the presence of a sharing AP (or master AP) and of shared APs (or slave APs).

As shown in FIG. 15, example 1500 may begin with AP 1402 transmitting a frame 1502 to AP 1404 and/or AP 1406. In an embodiment, frame 1502 solicits a DL BSR from AP 1404 and/or AP 1406 for a multi-AP transmission. The multi-AP transmission may be performed within an allocated time of a TXOP obtained by AP 1402. The multi-AP transmission may be performed in the context of an inter-AP TXS procedure as described above. The multi-AP transmission may or may not comprise AP 1402. The multi-AP transmission may be a coordinated DL PPDU transmission by AP 1402 and one or more of APs 1404 and 1406. Alternatively, as shown in FIG. 15, the multi-AP transmission may be a coordinated DL PPDU transmission by APs 1404 and 1406. The coordinated DL PPDU transmission may comprise a C-OFDMA transmission, a coordinated spatial reuse (C-SR) transmission, a coordinated beamforming (C-BF), or a coordinated joint transmission. Frame 1502 may comprise a buffer status report poll (BSRP) trigger frame, a basic trigger frame, a poll frame, or a soliciting frame.

In an embodiment, AP 1404 may respond to frame 1502 by transmitting a frame 1504 to AP 1402. In an embodiment, frame 1504 comprises a DL BSR for the multi-AP transmission. The DL BSR may indicate an amount of traffic buffered for DL transmission at AP 1404. The DL BSR may indicate the amount of buffered traffic as described with reference to FIG. 4 above (e.g., in a queue size subfield). In an implementation, the buffered traffic may correspond to all traffic buffered for DL transmission at AP 1404. In another implementation, the buffered traffic may correspond to the traffic buffered for DL transmission to a particular STA that AP 1404 intends to serve during the multi-AP transmission. Additionally, or alternatively, the buffered traffic may correspond to the traffic buffered for DL transmission for a particular access category (AC) or TID.

In an embodiment, frame 1504 may, additionally or alternatively, indicate a number of STAs, associated with AP 1404, for a DL transmission from AP 1404. The STAs which number is indicated in frame 1504 may be STAs that AP 1404 intends or wishes to transmit to in the DL transmission. The DL transmission from AP 1404 may be a part of the multi-AP transmission.

In an embodiment, frame 1504 further indicates a DL transmission parameter for transmission of the first part of a DL PPDU for the DL transmission. In an embodiment, the DL transmission parameter may include/indicate one or more of an MCS, a bandwidth (BW) size, an RU size, a PPDU type, or a number of spatial streams (Nss) for the transmission of the first part.

In an embodiment, where the DL transmission parameter includes/indicates an MCS, frame 1504 may include an MCS index. In another embodiment, in addition to the MCS index, frame 1504 may indicate a PPDU type/format (e.g., HT, HE, VHT, EHT, UHR, etc.). In a further embodiment, frame 1504 may further indicate a requested bandwidth (e.g., 20 MHz, 40 MHz, etc.) for the DL transmission. In an embodiment, frame 1504 may indicate a plurality of MCS indices for a plurality of bandwidth values for the DL transmission.

In an embodiment, the DL transmission parameter may be determined by AP 1404. The DL transmission parameter may be selected by AP 1404 from a plurality of DL transmission parameters. The plurality of DL transmission parameters may be pre-configured in AP 1404. In an example, the DL transmission parameter may be suggested by AP 1404 for the DL transmission. For example, the DL transmission parameter may be a preferred parameter for the DL transmission.

In another embodiment, frame 1504 may indicate a duration for a first part of a DL PPDU for the DL transmission from AP 1404.

In another embodiment, frame 1408 may indicate a duration for a first field within the first part of the DL PPDU for the DL transmission from AP 1404. For example, frame 1408 may indicate a duration for a UHR-SIG field within the first part of the DL PPDU. The UHR-SIG field may be the first field within the first part of the DL PPDU.

In an embodiment, frame 1504 may be a QoS data/null frame or an action frame, for example. When frame 1504 is a QoS data/null frame, the QoS data/null frame may comprise an aggregated control (A-Control) field comprising the number of STAs and/or the duration of the first part of the DL PPDU (and/or the duration of a field of the first part of the DL PPDU) as illustrated in FIG. 16, for example. When frame 1504 is an action frame, the action frame may comprise an information element (or an information field) comprising the number of STAs and/or the duration of the first part of the DL PPDU (and/or the duration of a field of the first part of the DL PPDU). The information element is illustrated in FIG. 17, for example.

In an example, example 1500 may also include AP 1406 transmitting a frame 1506 to AP 1402. Frame 1506 may be transmitted before or after frame 1504. In an embodiment, frame 1506 may indicate a number of STAs, associated with AP 1406, for a DL transmission from AP 1406. The DL transmission from AP 1406 may be a part of the multi-AP transmission comprising the DL transmission from AP 1404. Frame 1506 is similar to frame 1504. The same description above regarding frame 1504 applies to frame 1506.

Subsequently, AP 1402 may obtain a TXOP and may initiate an inter-AP TXS operation by transmitting an MRTT frame 1508 to APs 1404 and 1406. MRTT frame 1508 may have a similar format as MU-RTS trigger frame 600 described above. In an example, MRTT frame 1508 may indicate identifiers of APs 1404 and 1406 (e.g., in respective AID 12 subfields of respective user info fields of MRTT frame 1508) and an allocated time 1510 (e.g., in respective allocation duration subfields of the user info fields) of the TXOP. Additionally, MRTT frame 1508 may indicate a TXS mode (e.g., in a triggered TXOP sharing mode subfield of common info field of MRTT frame 1508). The TXS mode may indicate whether APs 1404 and 1406 shall communicate with AP 1402 only during allocated time 1510 (e.g., when the TXS mode is set to 1) or whether APs 1404 and 1406 may communicate with AP 1402 or other STAs (e.g., an associated non-AP STA or another AP STA) during allocated time 1510.

In an embodiment, MRTT frame 1508 may further indicate a time period 1524, within allocated time 1510, for a multi-AP transmission. The multi-AP transmission may or may not comprise AP 1402. The multi-AP transmission may be a coordinated DL PPDU transmission by AP 1402 and one or more of APs 1404 and 1406. Alternatively, as shown in FIG. 15, the multi-AP transmission may be a coordinated DL PPDU transmission by APs 1404 and 1406. The coordinated DL PPDU transmission may comprise a C-OFDMA transmission, a coordinated spatial reuse (C-SR) transmission, a coordinated beamforming (C-BF), or a coordinated joint transmission. In an embodiment, the multi-AP transmission may be in response to frames 1504 and 1506 from APs 1404 and 1406, respectively, signaling information for respective DL transmissions from APs 1404 and 1406.

In an embodiment, MRTT frame 1508 may further indicate a time period 1526 for a first part of a DL PPDU for the DL transmission from AP 1404 and/or the DL transmission from AP 1406. In an embodiment, time period 1526 may be based on the number of STAs indicated in frame 1504 and/or the number of STAs indicated in frame 1506. In an embodiment, time period 1526 corresponds to a transmission duration of the first part of the DL PPDU. In another embodiment, time period 1526 may be further based on the DL transmission parameter indicated in frame 1504 and/or frame 1506.

In an example, the DL PPDU may have a format as illustrated in FIG. 12. In an embodiment, the first part may comprise one or more of: the L-STF, the L-LTF, the L-SIG, the RL-SIG, the U-SIG, and the UHR-SIG of the DL PPDU. In an example, the first part comprises the L-STF, the L-LTF, the L-SIG, the RL-SIG, the U-SIG, and the UHR-SIG of the DL PPDU. In another embodiment, first part may comprise one or more of: the L-STF, the L-LTF, the L-SIG, the RL-SIG, the U-SIG, the UHR-SIG, the UHR-STF, and the UHR-LTF of the DL PPDU. In an example, the first part comprises the L-STF, the L-LTF, the L-SIG, the RL-SIG, the U-SIG, the UHR-SIG, the UHR-STF, and the UHR-LTF of the DL PPDU.

In an embodiment, AP 1402 may determine a first length for the first part of the DL PPDU based on the number of STAs indicated in frame 1504. In an embodiment, AP 1402 may determine a second length for the first part of the DL PPDU based on the number of STAs indicated in frame 1506. In an example, based on the number of STAs indicated in frame 1504/1506, AP 1402 may determine the required size (e.g., number of OFDM symbols) of one or more fields of the first part which size varies with the number of STAs being served by the DL PPDU. The padding bits may be inserted in the middle of the first part. For example, the padding bits may be added at the end of a UHR-SIG field of the first part or within the UHR-SIG field or right before a CRC field of the UHR-SIG. For example, AP 1402 may determine the number/size of UHR-LTFs required for the DL PPDU.

In an embodiment, AP 1402 may determine a first duration based on the first length of the first part of the DL PPDU. In an embodiment, AP 1402 may determine a second duration based on the second length of the first part of the DL PPDU. In an embodiment, AP 1402 may select the larger of the first duration and the second duration as time period 1526. As such, time period 1526 is guaranteed to be sufficiently long to accommodate the DL traffic requirements of both APs 1404 and 1406. In another embodiment, time period 1526 may be subject to a maximum duration for the first part of the PPDU. That is, time period 1526 may not exceed the maximum duration. In another embodiment, AP 1402 may select the shorter of the first duration and the second duration as time period 1526. This ensures that time period 1526 can be fully utilized by at least one of APs 1404 and 1406.

In an embodiment, MRTT frame 1508 may comprise a duration of time period 1526. In an embodiment, a start time of time period 1526 may be determined based on MRTT frame 1508. For example, the start time of time period 1526 may be 2 SIFS plus a CTS frame transmission time from the time of receiving MRTT frame 1508. An end time of time period 1526 may be determined based on the start time and the indicated duration.

In another embodiment, MRTT frame 1508 may comprise a start time and an end time of time period 1526, a start time and a duration of time period 1526, or a duration and an end time of time period 1526. In such an embodiment, the start time of time period 1526 may not be based on MRTT frame 1508.

In another embodiment, MRTT frame 1508 may indicate time period 1526 as a segment of allocated time 1510. For example, MRTT frame 1508 may indicate that time period 1526 corresponds to a first half/third/quarter of allocated time 1510, or a first X microseconds of allocated time 1510, etc.

In another embodiment, MRTT frame 1508 may indicate time period 1526 by indicating a number of OFDM symbols (of a given duration in accordance with OFDM symbols of the first part, e.g., 4 microseconds) to be transmitted during time period 1526.

In other embodiments, AP 1402 may initiate the inter-AP TXS operation by transmitting a frame other than an MRTT frame. For example, AP 1402 may use a multi-AP trigger frame for initiating the inter-AP TXS operation. The multi-AP trigger frame may comprise/indicate the same information described above as comprised/indicated in MRTT frame 1508. APs 1404 and 1406 may or may not respond to or acknowledge the multi-AP trigger frame from AP 1402.

As shown in FIG. 15, APs 1404 and 1406 may respond to MRTT frame 1508 by transmitting CTS frames 1512 and 1514 respectively to AP 1402. Subsequently, e.g., a SIFS after transmitting respectively CTS frames 1512 and 1514, APs 1404 and 1406 may proceed, without trigger from AP 1402, to use allocated time 1510 for communication in accordance with the TXS mode indicated in MRTT frame 1508 and with account for time period 1524. In example 1400, the TXS mode may permit APs 1404 and 1406 to communicate with AP 1402 or with another STA during allocated time 1510. As such, as shown in FIG. 15, AP 1404 may use time period 1524 of allocated time 1510 to transmit a (non-TB) DL PPDU 1516 to an associated STA (not shown in FIG. 15). In transmitting DL PPDU 1516, AP 1404 may use time period 1526 for a first part of DL PPDU 1516. AP 1404 may insert padding bits at the end of the first part to make sure that the transmission duration of the first part is equal to time period 1526. Similarly, AP 1406 may use time period 1524 to transmit a (non-TB) DL PPDU 1518 to an associated STA (not shown in FIG. 15). In transmitting DL PPDU 1518, AP 1406 may use time period 1526 for a first part of DL PPDU 1518. With the time period 1526 set by AP 1402 as described above, AP 1406 may not need to insert any padding bits at the end of the first part of DL PPDU 1518 and may utilize time period 1526 in its entirety for transmission of the first part of DL PPDU 1518. Utilization of allocated time 1510, and particularly time period 1526, is therefore increased.

In an example, AP 1404 may use a remaining duration of allocated time 1510, in accordance with any indication in MRTT frame 1508, to receive an UL PPDU 1520 from an associated STA (not shown in FIG. 15). In an example, AP 1406 may use a remaining duration of allocated time 1510, in accordance with any indication in MRTT frame 1508, to receive an UL PPDU 1522 from an associated STA (not shown in FIG. 15). In an embodiment, as described above, frame 1508 may further indicate a time period for a first part of UL PPDUs 1520 and 1522. In an embodiment, AP 1404 may signal the time period to its associated STA scheduled to transmit UL PPDU 1520. In an embodiment, AP 1406 may signal the time period to its associated STA scheduled to transmit UL PPDU 1522.

In an example, C-OFDMA may be used for the transmission of DL PPDUs 1516 and 1518 and UL PPDUs 1520 and 1522. Specifically, AP 1402 may assign APs 1404 and 1406 respective frequency resources that are orthogonal to each other for allocated time 1510. For example, AP 1402 may divide an 80 MHz channel into two non-overlapping 40 MHz channels, each assigned to a respective one of APs 1404 and 1406. In an example, the frequency resources assigned to an AP are indicated in an RU allocation subfield of a user info field (that indicates the identifier of the AP) of MRTT frame 1508. DL PPDU 1516 and UL PPDU 1520 may thus be transmitted on RUs that are orthogonal to the RUs used for the transmission of DL PPDU 1518 and UL PPDU 1522.

FIG. 16 illustrates example A-Control fields 1602 and 1604 which may be used in embodiments. A-Control fields 1602 and 1604 may be used to carry the number of STAs associated with an AP for a DL transmission and/or the duration of a first part of a DL PPDU for the DL transmission, in a QoS data/null frame. As shown in FIG. 16, A-Control fields 1602 and 1604 may include a control ID field that indicates the type of A-Control fields 1602 and 1604. In an example, the control ID field may indicate that A-Control fields 1602 and 1604 comprise a BSR for a DL coordinated transmission ("C-BSR"). In an embodiment, A-Control field 1602 includes a "Number of DL STAs" field. The "Number of DL STAs" field indicates the number of STAs associated with an AP for a DL transmission as described above. In an embodiment, A-Control field 1604 includes a "Duration of first part of DL PPDU" field. The "Duration of first part of DL PPDU" field may include/indicate a duration of a first part of a DL PPDU for a DL transmission as described above.

FIG. 17 illustrates example information elements 1702 and 1704 which may be used in embodiments. Information elements 1702 and 1704 may be used to carry the number of STAs associated with an AP for a DL transmission and/or the duration of a first part of a DL PPDU for the DL transmission, in an action frame. As shown in FIG. 17, information elements 1702 and 1704 may include an element ID field, a length field, and an element ID extension field. The element ID and the element ID extension fields indicate the type of information elements 1702 and 1704. In an example, the element ID and the element ID extension fields may indicate that information elements 1702 and 1704 comprise a BSR for a DL coordinated transmission ("C-BSR"). In an embodiment, information element 1702 further includes a "Number of DL STAs" field. The "Number of DL STAs" field indicates the number of STAs associated with an AP for a DL transmission as described above. In an embodiment, information element 1704 further includes a "Duration of first part of DL PPDU" field. The "Duration of first part of DL PPDU" field may include/indicate a duration of a first part of a DL PPDU for a DL transmission as described above.

Figure 18:
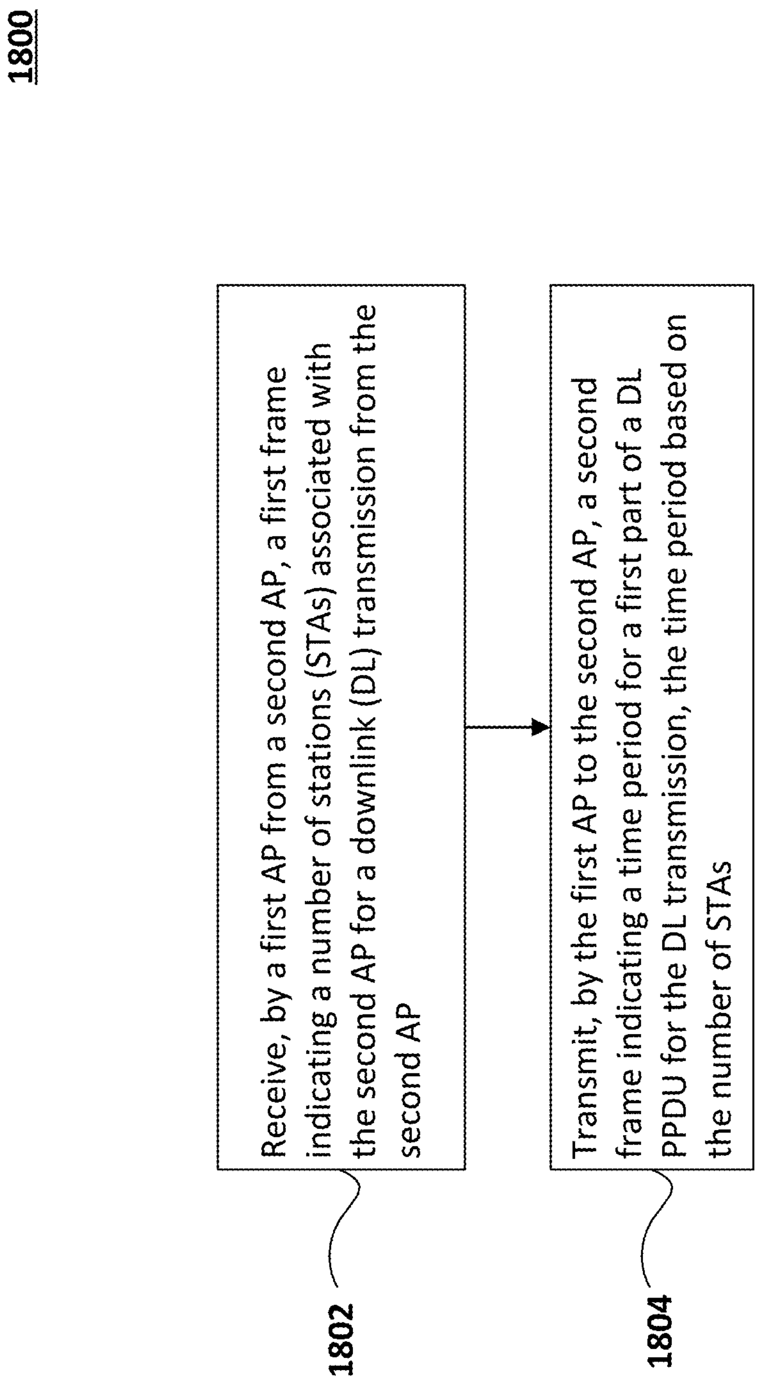
FIG. 18 illustrates an example process according to an embodiment.

FIG. 18 illustrates an example process 1800 according to an embodiment. Example process 1800 may be performed by a first AP, such as AP 1402 described above. As shown in FIG. 18, process 1800 includes steps 1802 and 1804.

Step 1802 includes receiving, by the first AP from a second AP, a first frame indicating a number of STAs associated with the second AP for a DL transmission from the second AP. In an example, the first AP and the second AP may form a multi-AP group. In an example, the first AP may be a sharing AP (or a master AP) of the multi-AP group and the second AP may be a shared AP (or slave AP) of the multi-AP group. The DL transmission may be a part of a multi-AP transmission. The multi-AP transmission may or may not comprise the first AP. The multi-AP transmission may comprise the second AP and a third AP. The STAs which number is indicated in the first frame may be STAs that the second AP intends or wishes to transmit to in the DL transmission.

In an embodiment, the first frame may comprise an action frame. The action frame may comprise an information element comprising the number of STAs associated with the second AP. In another embodiment, the first frame comprises a QoS null or data frame. The QoS null or data frame may comprise an A-Control field comprising the number of STAs associated with the second AP.

Step 1804 transmitting, by the first AP to the second AP, a second frame indicating a time period for a first part of a DL PPDU for the DL transmission. The DL PPDU may be a part of a C-OFDMA DL transmission. In an embodiment, the time period is based on the number STAs indicated in the first frame. In an embodiment, the time period corresponds to a transmission duration of the first part.

In an embodiment, the first part comprises one or more of: an L-STF, an L-LTF, an L-SIG, an RL-SIG, a U-SIG, and a UHR-SIG. In an embodiment, the first part comprises one or more of: an L-STF, an L-LTF, an L-SIG, an RL-SIG, a U-SIG, a UHR-SIG, a UHR-STF, and a UHR-LTF.

In an embodiment, the second frame further indicates an allocated time of a TXOP obtained by the first AP. In an embodiment, the time period is within the allocated time of the TXOP. In an embodiment, the second frame comprises an MRTT frame or a multi-AP trigger frame. In an embodiment, the second frame further indicates an identifier of the second AP.

In an embodiment, the first frame further indicates a DL transmission parameter for transmission of the first part of the DL PPDU. The DL transmission parameter may be selected by the second AP from a plurality of DL transmission parameters. The DL transmission parameter may be suggested/preferred by the second AP for the DL transmission. The DL transmission parameter may comprise one or more of a modulation and coding scheme (MCS), a bandwidth size, a resource unit (RU) size, a physical layer protocol data unit (PPDU) type, or a number of spatial streams for the transmission of the first part. In an embodiment, the time period may be further based on the DL transmission parameter.

In an embodiment, the first frame may comprise a DL BSR indicating an amount of DL traffic buffered at the second AP. The DL BSR may be a C-OFDMA BSR. In an embodiment, process 1800 may further comprise transmitting, to the second AP, a third frame soliciting the DL BSR; and receiving the first frame in response to the third frame. The third frame may comprise a buffer status report poll (BSRP) trigger frame, a basic trigger frame, a poll frame, or a soliciting frame.

Figure 19:
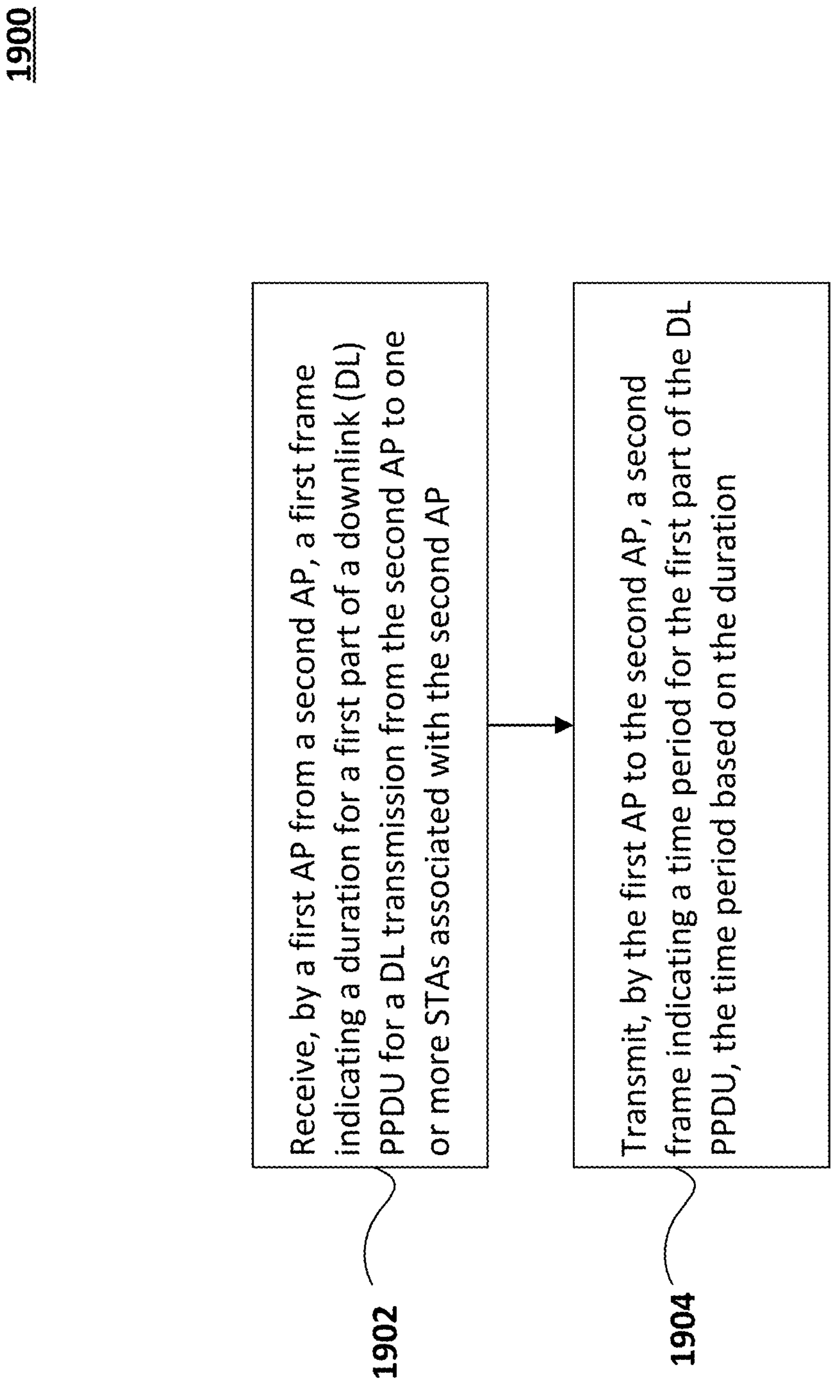
FIG. 19 illustrates another example process according to an embodiment.

FIG. 19 illustrates another example process 1900 according to an embodiment. Example process 1900 may be performed by a first AP, such as AP 1402 described above. As shown in FIG. 19, process 1900 includes steps 1902 and 1904.

Step 1902 includes receiving, by the first AP from a second AP, a first frame indicating a duration for a first part of a DL PPDU for a DL transmission from the second AP to one or more STAs associated with the second AP. In an example, the first AP and the second AP may form a multi-AP group. In an example, the first AP may be a sharing AP (or a master AP) of the multi-AP group and the second AP may be a shared AP (or slave AP) of the multi-AP group. The DL transmission may be a part of a multi-AP transmission. The multi-AP transmission may or may not comprise the first AP. The multi-AP transmission may comprise the second AP and a third AP. The STAs which number is indicated in the first frame may be STAs that the second AP intends or wishes to transmit to in the DL transmission. The STAs may be STAs scheduled by the second AP.

In an embodiment, the first part comprises one or more of: an L-STF, an L-LTF, an L-SIG, an RL-SIG, a U-SIG, and a UHR-SIG. In an embodiment, the first part comprises one or more of: an L-STF, an L-LTF, an L-SIG, an RL-SIG, a U-SIG, a UHR-SIG, a UHR-STF, and a UHR-LTF.

The duration indicated in the first frame may be preferred/recommended/selected by the second AP. In an embodiment, the duration may be based on a length of the first part. The length of the first part may comprise a number of OFDM symbols. In an embodiment, an OFDM symbol of the OFDM symbols has a unit/granularity of.

Step 1904 includes transmitting, by the first AP to the second AP, a second frame indicating a time period for the first part of the DL PPDU. In an embodiment, the time period is based on the duration indicated in the first frame.

In an embodiment, the second frame may further indicate an allocated time of a TXOP obtained by the first AP. In an embodiment, the time period for the first part is within the allocated time. In an embodiment, the second frame may further comprise an identifier of the second AP.

Figure 20:
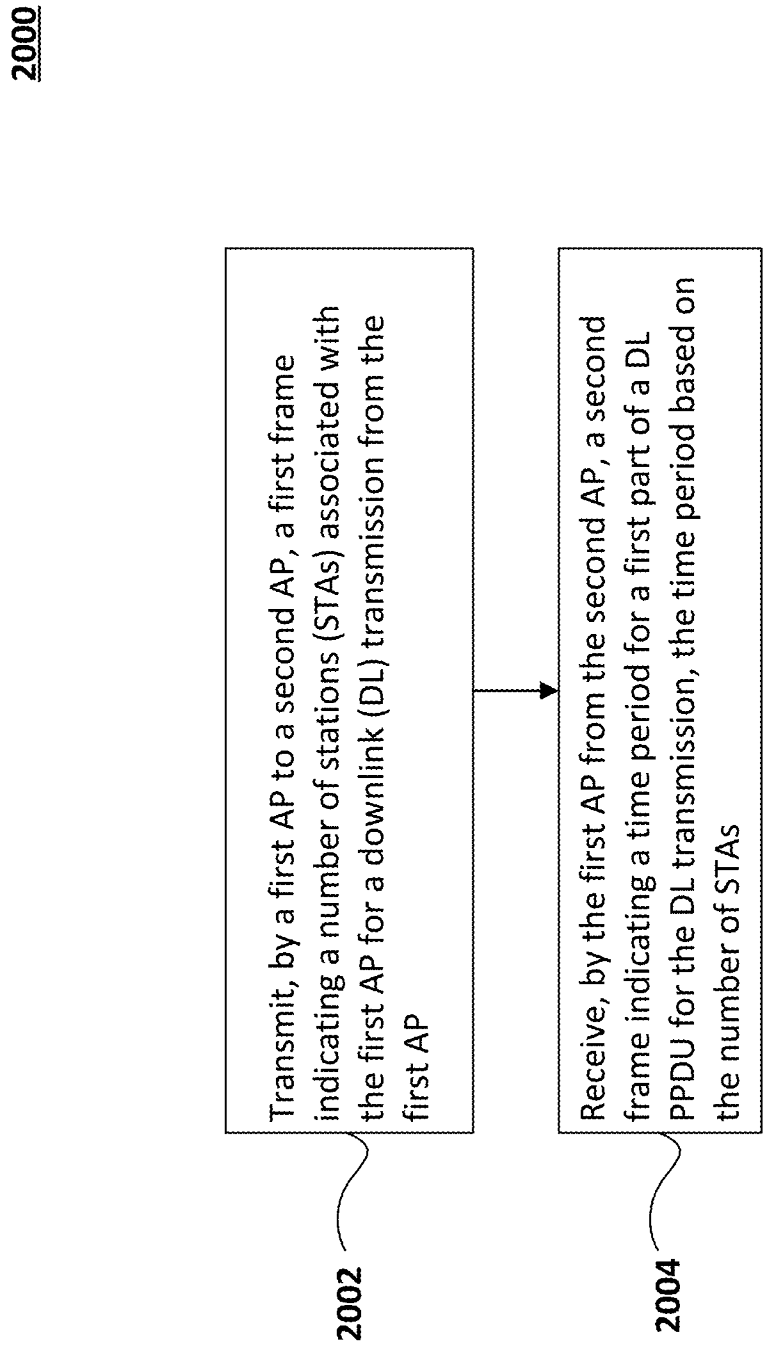
FIG. 20 illustrates another example process according to an embodiment.

FIG. 20 illustrates another example process 2000 according to an embodiment. Example process 200 may be performed by a first AP, such as AP 1404 or 1406 described above. As shown in FIG. 20, process 2000 includes steps 2002 and 2004.

Step 2002 includes transmitting, by the first AP to a second AP, a first frame indicating a number of STAs associated with the first AP for a DL transmission from the first AP. In an example, the first AP and the second AP may form a multi-AP group. In an example, the second AP may be a sharing AP (or a master AP) of the multi-AP group and the first AP may be a shared AP (or slave AP) of the multi-AP group. The DL transmission may be a part of a multi-AP transmission. The multi-AP transmission may or may not comprise the second AP. The multi-AP transmission may comprise the first AP and a third AP. The STAs which number is indicated in the first frame may be STAs that the first AP intends or wishes to transmit to in the DL transmission.

In an embodiment, the first frame may comprise an action frame. The action frame may comprise an information element comprising the number of STAs associated with the first AP. In another embodiment, the first frame comprises a QoS null or data frame. The QoS null or data frame may comprise an A-Control field comprising the number of STAs associated with the first AP.

Step 2004 receiving, by the first AP from the second AP, a second frame indicating a time period for a first part of a DL PPDU for the DL transmission. The DL PPDU may be a part of a C-OFDMA DL transmission. In an embodiment, the time period is based on the number STAs indicated in the first frame. In an embodiment, the time period corresponds to a transmission duration of the first part.

In an embodiment, the first part comprises one or more of: an L-STF, an L-LTF, an L-SIG, an RL-SIG, a U-SIG, and a UHR-SIG. In an embodiment, the first part comprises one or more of: an L-STF, an L-LTF, an L-SIG, an RL-SIG, a U-SIG, a UHR-SIG, a UHR-STF, and a UHR-LTF.

In an embodiment, the second frame further indicates an allocated time of a TXOP obtained by the second AP. In an embodiment, the time period is within the allocated time of the TXOP. In an embodiment, the second frame comprises an MRTT frame or a multi-AP trigger frame. In an embodiment, the second frame further indicates an identifier of the first AP.

In an embodiment, the first frame further indicates a DL transmission parameter for transmission of the first part of the DL PPDU. The DL transmission parameter may be selected by the first AP from a plurality of DL transmission parameters. The DL transmission parameter may be suggested/preferred by the first AP for the DL transmission. The DL transmission parameter may comprise one or more of a modulation and coding scheme (MCS), a bandwidth size, a resource unit (RU) size, a physical layer protocol data unit (PPDU) type, or a number of spatial streams for the transmission of the first part. In an embodiment, the time period may be further based on the DL transmission parameter.

In an embodiment, the first frame may comprise a DL BSR indicating an amount of DL traffic buffered at the first AP. The DL BSR may be a C-OFDMA BSR. In an embodiment, process 2000 may further comprise receiving, by the first AP from the second AP, a third frame soliciting the DL BSR; and transmitting the first frame in response to the third frame. The third frame may comprise a buffer status report poll (BSRP) trigger frame, a basic trigger frame, a poll frame, or a soliciting frame.

Figure 21:
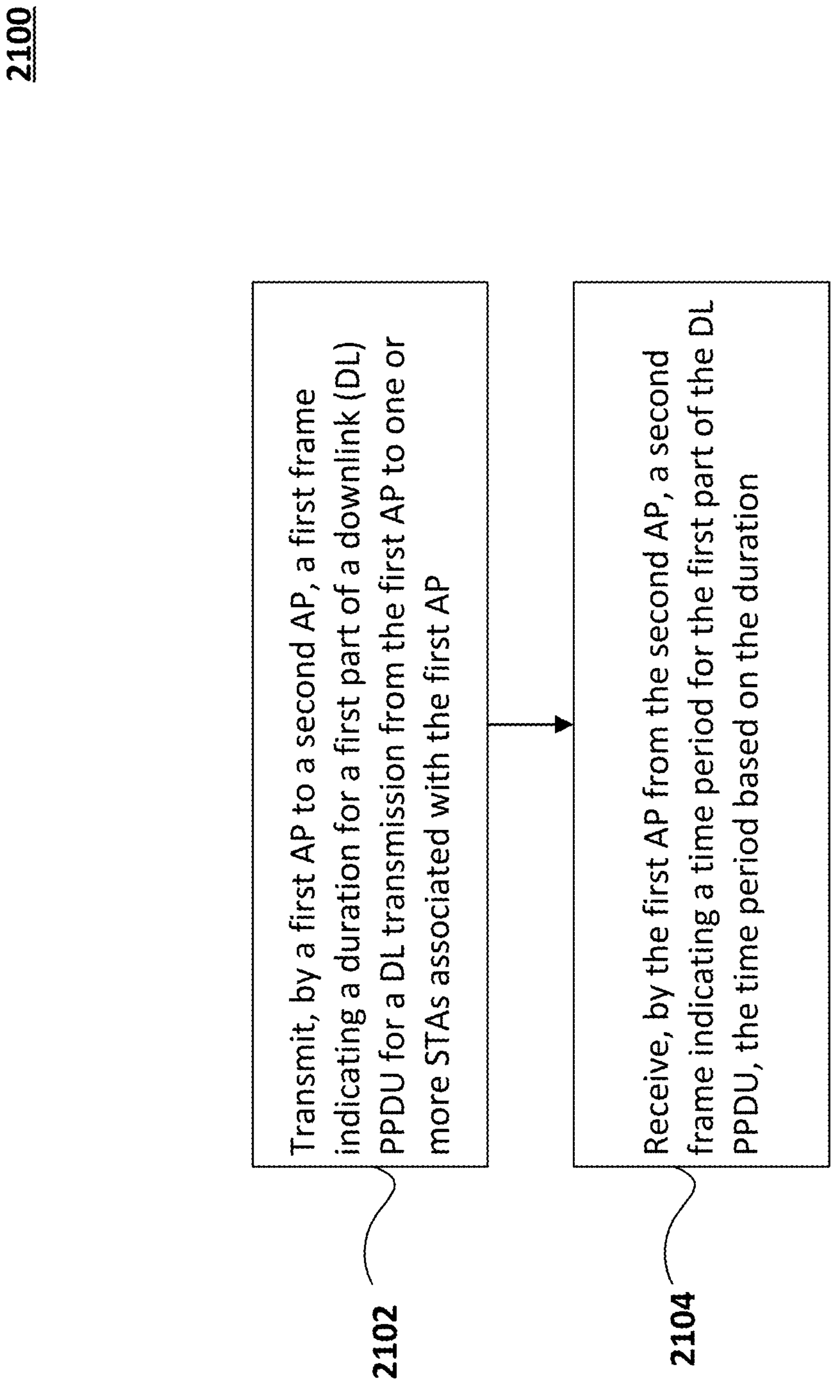
FIG. 21 illustrates another example process according to an embodiment.

FIG. 21 illustrates another example process 2100 according to an embodiment. Example process 2100 may be performed by a first AP, such as AP 1404 or 1406 described above. As shown in FIG. 21, process 2100 includes steps 2102 and 2204.

Step 2102 includes transmitting, by the first AP to a second AP, a first frame indicating a duration for a first part of a DL PPDU for a DL transmission from the first AP to one or more STAs associated with the first AP. In an example, the first AP and the second AP may form a multi-AP group. In an example, the second AP may be a sharing AP (or a master AP) of the multi-AP group and the first AP may be a shared AP (or slave AP) of the multi-AP group. The DL transmission may be a part of a multi-AP transmission. The multi-AP transmission may or may not comprise the second AP. The multi-AP transmission may comprise the first AP and a third AP. The STAs which number is indicated in the first frame may be STAs that the first AP intends or wishes to transmit to in the DL transmission. The STAs may be STAs scheduled by the first AP.

In an embodiment, the first part comprises one or more of: an L-STF, an L-LTF, an L-SIG, an RL-SIG, a U-SIG, and a UHR-SIG. In an embodiment, the first part comprises one or more of: an L-STF, an L-LTF, an L-SIG, an RL-SIG, a U-SIG, a UHR-SIG, a UHR-STF, and a UHR-LTF.

The duration indicated in the first frame may be preferred/recommended/selected by the first AP. In an embodiment, the duration may be based on a length of the first part. The length of the first part may comprise a number of OFDM symbols. In an embodiment, an OFDM symbol of the OFDM symbols has a unit/granularity of 4 us.

Step 2104 includes receiving, by the first AP from the second AP, a second frame indicating a time period for the first part of the DL PPDU. In an embodiment, the time period is based on the duration indicated in the first frame.

In an embodiment, the second frame may further indicate an allocated time of a TXOP obtained by the second AP. In an embodiment, the time period for the first part is within the allocated time. In an embodiment, the second frame may further comprise an identifier of the first AP.

The invention claimed is:

1. A first access point (AP) comprising:

one or more processors; and memory storing instructions that, when executed by the one or more processors, cause the first AP to:

receive, from a second AP, a first frame indicating a number of stations (STAs) associated with the second AP for a downlink (DL) transmission from the second AP; and transmit, to the second AP, a second frame indicating a time period for a first part of a DL physical layer protocol data unit (PPDU) for the DL transmission, the time period based on the number of STAs.

2. The first AP of claim 1, wherein the second frame further indicates an allocated time of a transmission opportunity (TXOP) obtained by the first AP.

3. The first AP of claim 1, wherein the first frame further indicates a DL transmission parameter for transmission of the first part of the DL PPDU.

4. The first AP of claim 1, wherein the time period corresponds to a transmission duration of the first part.

5. The first AP of claim 1, wherein the DL PPDU is a part of a coordinated beamforming transmission.

6. The first AP of claim 1, wherein the second frame comprises a multi-AP trigger frame.

7. The first AP of claim 1, wherein the second frame further indicates an identifier of the second AP.

8. The first AP of claim 1, wherein the first part comprises one or more of: an L-STF, an L-LTF, an L-SIG, an RL-SIG, a U-SIG, a UHR-SIG, a UHR-STF, and a UHR-LTF.

9. A first access point (AP) comprising:

one or more processors; and memory storing instructions that, when executed by the one or more processors, cause the first AP to:

transmit, to a second AP, a first frame indicating a number of stations (STAs) associated with the first AP for a downlink (DL) transmission from the first AP; and receive, from the second AP, a second frame indicating a time period for a first part of a DL physical layer protocol data unit (PPDU) for the DL transmission, the time period based on the number of STAs.

10. The first AP of claim 9, wherein the second frame further indicates an allocated time of a transmission opportunity (TXOP) obtained by the second AP.

11. The first AP of claim 9, wherein the first frame further indicates a DL transmission parameter for transmission of the first part of the DL PPDU.

12. The first AP of claim 9, wherein the time period corresponds to a transmission duration of the first part.

13. The first AP of claim 9, wherein the DL PPDU is a part of a coordinated beamforming transmission.

14. The first AP of claim 9, wherein the second frame comprises a multi-AP trigger frame.

15. The first AP of claim 9, wherein the second frame further indicates an identifier of the first AP.

16. The first AP of claim 9, wherein the first part comprises one or more of: an L-STF, an L-LTF, an L-SIG, an RL-SIG, a U-SIG, a UHR-SIG, a UHR-STF, and a UHR-LTF.

17. A non-transitory computer-readable medium comprising instructions that, when executed by one or more processors of a first access point (AP), cause the first AP to:

receive, from a second AP, a first frame indicating a number of stations (STAs) associated with the second AP for a downlink (DL) transmission from the second AP; and transmit, to the second AP, a second frame indicating a time period for a first part of a DL physical layer protocol data unit (PPDU) for the DL transmission, the time period based on the number of STAs.

18. The non-transitory computer-readable medium of claim 17, wherein the second frame further indicates an allocated time of a transmission opportunity (TXOP) obtained by the first AP.

19. The non-transitory computer-readable medium of claim 17, wherein the DL PPDU is a part of a coordinated beamforming transmission.

20. The non-transitory computer-readable medium of claim 17, wherein the second frame further indicates an identifier of the second AP.

* * * * *